US009453284B2

(12) United States Patent
Berthelot et al.

(10) Patent No.: US 9,453,284 B2
(45) Date of Patent: Sep. 27, 2016

(54) CHEMICAL MODIFICATION PROCESS FOR A DEEP POLYMERIC MATRIX

(75) Inventors: Thomas Berthelot, Villebon sur Yvette (FR); Cécile Baudin, Paris (FR)

(73) Assignee: Commissariat a L'Energie Atomique et aux Energies Alternatives, Paris (FR)

( * ) Notice: Subject to any disclaimer, the term of this patent is extended or adjusted under 35 U.S.C. 154(b) by 258 days.

(21) Appl. No.: 12/772,122

(22) Filed: Apr. 30, 2010

(65) Prior Publication Data

US 2010/0311857 A1 Dec. 9, 2010

(30) Foreign Application Priority Data

Apr. 30, 2009 (FR) ...................... 09 52891
Aug. 27, 2009 (FR) ...................... 09 55859

(51) Int. Cl.
| | |
|---|---|
| B05D 3/06 | (2006.01) |
| C23C 18/16 | (2006.01) |
| C08J 3/28 | (2006.01) |
| C08J 7/12 | (2006.01) |
| C08J 7/16 | (2006.01) |
| C23C 18/18 | (2006.01) |
| C23C 18/20 | (2006.01) |

(52) U.S. Cl.
CPC .............. *C23C 18/1601* (2013.01); *C08J 3/28* (2013.01); *C08J 7/123* (2013.01); *C08J 7/16* (2013.01); *C23C 18/18* (2013.01); *C23C 18/1844* (2013.01); *C23C 18/1893* (2013.01); *C23C 18/2086* (2013.01); *C08J 2323/26* (2013.01); *C08J 2327/18* (2013.01); *Y10T 428/1352* (2015.01)

(58) Field of Classification Search
CPC .............. C08J 3/28; C08J 7/123; C08J 7/16; C08J 2323/26; C08J 2327/18; C23C 18/18; C23C 18/1844; C23C 18/2086
USPC ..................... 522/156, 157, 161, 2
See application file for complete search history.

(56) References Cited

U.S. PATENT DOCUMENTS

| | | | | |
|---|---|---|---|---|
| 3,607,536 | A | * | 9/1971 | Bragole .................... 428/423.3 |
| 4,226,687 | A | * | 10/1980 | Sasaki et al. ................ 522/3 |
| 4,593,050 | A | * | 6/1986 | Cohen et al. ................ 522/2 |
| 4,666,569 | A | * | 5/1987 | Basol .......................... 438/603 |
| 4,981,715 | A | | 1/1991 | Hirsch et al. |
| 5,185,188 | A | * | 2/1993 | Abe et al. ..................... 427/533 |
| 5,571,852 | A | * | 11/1996 | Afzali-Ardakani et al. . 523/215 |
| 5,684,065 | A | * | 11/1997 | Hiraoka et al. ............... 523/300 |
| 5,888,366 | A | * | 3/1999 | Engelhardt et al. .......... 204/471 |
| 7,081,486 | B2 | * | 7/2006 | Imai et al. ..................... 522/60 |
| 7,273,531 | B2 | * | 9/2007 | Jing et al. ..................... 156/272.2 |
| 7,531,204 | B2 | * | 5/2009 | Lee et al. ........................ 427/58 |
| 2006/0166046 | A1 | | 7/2006 | Dubitsky et al. |
| 2010/0311860 | A1 | | 12/2010 | Berthelot et al. |

FOREIGN PATENT DOCUMENTS

| | | | |
|---|---|---|---|
| FR | 2910011 A1 | | 6/2008 |
| JP | 06-220228 | * | 9/1994 |
| WO | 2004004053 A2 | | 1/2004 |
| WO | 2009040365 A1 | | 4/2009 |

OTHER PUBLICATIONS

Adenier, A. et al., "Study of the Spontaneous Formation of Organic Layers on Carbon and Metal Surfaces from Diazonium Salts", Surface Science, vol. 600, 2006, pp. 4801-4812.
Betz, N. et al., "Free Radicals in Swift Heavy Ion Irradiated Fluoropolymers: An Electron Spin Resonance Study," Radiat. Phys. Chem., vol. 47, No. 3, 1996, pp. 411-414.
Charbonnier, M., "Laser-Assisted Grafting Onto Polycarbonate: Application to Metallization by Chemical Means," Applied Surface Science, vol. 109/110, 1997, pp. 206-211.
Chen, Y.W. et al. "Controlled Grafting From Poly(vinylidene fluoride) Microfiltration Membranes Via Reverse Atom Transfer Radical Polymerization and Antifouling Properties," Polymer, vol. 48, No. 26, 2007, pp. 7604-7613.
Clochard, M. C. et al., "Tailoring Bulk and Surface Grafting of Poly(acrylic acid) in Electron-Irradiated PVDF," Polymer, vol. 45, 2004, pp. 8683-8694.
Dadsetan, M., "Surface Modification of Polyethylene Terephthalate Film by CO2 Laser-Induced Graft Copolymerization of Acrylamide," Journal of Applied Polymer Science, vol. 76, 2000, pp. 401-407.
Dargaville, T. R. et al., "Evaluation of Piezoelectric PVDF Polymers for Use in Space Environments. III. Comparison of the Effects of Vacuum UV and Gamma Radiation," Journal of Polymer Science: Part B: Polymer Physics, vol. 44, 2006, pp. 3253-3264.
Deng, J. et al., "Developments and New Applications of UV-Induced Surface Graft Polymerizations," Progress in Polymer Science, 2009, vol. 34, pp. 156-193.
Gao, C., "Facile and Large-Scale Synthesis and Characterization of Carbon Nanotube/Silver Nanocrystal Nanohybrids," Institute of Physics Publishing, Nanotechnology 17, 2006, pp. 2882-2890.
Gejo, J. L. et al., "Vacuum-Ultraviolet Photochemically Initiated Modification of Polystyrene Surfaces: Morphological Changes and Mechanistic Investigations," Photochemical & Photobiological Sciences, vol. 5, 2006, pp. 948-954.

(Continued)

*Primary Examiner* — Nathan M Nutter
(74) *Attorney, Agent, or Firm* — Nixon Peabody LLP; Khaled Shami

(57) ABSTRACT

The present invention relates to a process for chemically modifying, within its thickness, a polymer matrix chosen from matrices made of fluoropolymers and matrices made of aliphatic polymers, said process comprising at least one step consisting in irradiating said matrix with UV light having a wavelength of less than 300 nm in order to generate, within the thickness of said matrix, zones that have short polymer chains, formed by scission of the existing chains during the passage of the UV radiation and that have free radicals denoted hereinbelow as "activated zones". The present invention also relates to the polymer matrix capable of being chemically modified by such a process.

7 Claims, 9 Drawing Sheets

(56) References Cited

OTHER PUBLICATIONS

Gupta, D. et al., "Basic Dyeable Polyester: a New Approach Using a VUV Excimer Lamp," Color. Technol., vol. 123, 2007, pp. 248-251.

He, D. et al. "Photo-Irradiation for Preparation, Modification and Stimulation of Polymeric Membranes," Progress in Polymer Science, vol. 34, 2009, pp. 62-98.

Izumi, Y. et al., "Irradiation Effects of Excimer Laser Light on Poly(vinylidene fluoride) (PVdF) Film," Bull. Chem. Soc. Jpn., vol. 71, 1998, pp. 2721-2725.

Kang, E. T. et al., "Surface Modification of Fluoropolymers via Molecular Design," Advanced Materials, vol. 12, No. 20, 2000, pp. 1481-1494.

Katan, E. et al., "The Effect of Some Fluoropolymers' Structures on Their Response to UV Irradiation," Journal of Applied Polymer Science, vol. 70, 1998, pp. 1471-1481.

Lippert, T., "Interaction of Photons with Polymers: From Surface Modification to Ablation," Plasma Processes and Polymers, vol. 2, 2005, pp. 525-546.

Mangeney, C. et al., "Electroless Ultrasonic Functionalization of Diamond Nanoparticles Using Aryl Diazonium Salts," Diamond and Related Materials, vol. 17, 2008, pp. 1881-1887.

Truica-Marasescu, F. E. et al., "Vacuum Ultraviolet Photolysis of Hydrocarbon Polymers," Macromolecular Chemistry and Physics, vol. 206, No. 7, Apr. 2005, pp. 744-757.

Niino, H. et al., "Biomaterial Immobilization on Polyurethane Films by XeCl Excimer Laser Processing," Appl. Phys A., vol. 72, 2001, pp. 53-57.

Pinson, J. et al., "Attachment of Organic Layers to Conductive or Semiconductive Surfaces by Reduction of Diazonium Salts," The Journal of the Royal Society of Chemistry Review, vol. 34, 2005, pp. 429-439.

Pireaux, J. J. et al., "Excimer Laser (A=193nm) Versus Al Ka X-ray Damages on Polymer Surfaces: an XPS (core and valence levels) Analysis of Polytetrafluoroethylene, Polypropylene and Polyethylene," Nuclear Instruments and Methods in Physics Research, vol. B. 105, 1995, pp. 186-191.

Svorcik, V. et al. "Cell Proliferation on UV-Excimer Lamp Modified and Grafted polytetrafluoroethylene," Nuclear Instruments and Methods in Physics Research, vol. B. 217, 2004, pp. 307-313.

Vasilets, V. N. et al., "Photolysis of a Fluorinated Polymer Film by Vacuum Ultraviolet Radiation," Journal of Polymer Science: Part A: Polymer Chemistry, vol. 36, 1998, pp. 2215-2222.

Zhu, Z. et al., "Grafting Onto Poly(ethylene terephthalate) Driven by 172 nm UV Light," Applied Surface Science, vol. 252, 2005, pp. 303-310.

French Search Report in French Application No. FR 0955859, mailed Mar. 10, 2010.

French Search Report in French Application No. FR 0952891, mailed Nov. 30, 2009.

International Search Report in International Application No. PCT/EP2010/055923, mailed Nov. 25, 2010.

Deng, Q., et al., "Preparation of Polymer Brushes From Poly(Vinylidene Fluoride) Surfaces by Uv Irradiation Pretreatment", Surface Review and Letters, 2007, vol. 14, pp. 23-30.

\* cited by examiner

CHEMICAL MODIFICATION PROCESS FOR A DEEP POLYMERIC MATRIX

CROSS REFERENCE TO RELATED APPLICATIONS OR PRIORITY CLAIM

This application claims priority of French Patent Application No. 09 52891, filed Apr. 30, 2009 and French Patent Application No. 09 55859, filed Aug. 27, 2009.

TECHNICAL FIELD

The present invention relates to the field of polymer materials.

More particularly, the present invention proposes a process that makes it possible to chemically modify a polymer material in depth, i.e. within the thickness of the material, in particular in order to modify the properties and the characteristics thereof. This chemical modification consists in creating activated zones within the thickness of the polymer which may, subsequently, either allow a radical grafting of an ethylenically unsaturated compound and/or of repeating units derived from such a compound, or be developed or hollowed out.

PRIOR ART

The chemical modification of the polymers has a large number of applications which include the recyclability of polymers, the crosslinking of polymers and the grafting to polymers that makes it possible to give them novel properties and features such as biocompatibility, metallization, adhesiveness, wettability or antifouling. The chemical modification of the polymers may also be used to prepare proton-conducting membranes for fuel cells via radiografting (International application WO 2009/040365 [1]).

The radiation-induced chemical modification of polymers is essentially based on the grafting of polymers to or within a first polymer that has undergone an irradiation with ionizing radiation such as γ radiation, electron beam irradiation or heavy ion beam irradiation.

The treatment of polymers by ionizing radiation leads to a transfer of energy from the incident radiation to the material in which it gives rise to the excitation and/or ionization of certain atoms or molecules. This excitation triggers a chemical process of formation of free radicals by ejection of electrons from the electron cloud of the atoms. These free radicals will subsequently be able to be used via radical chemistry in order to introduce new functional groups within the first polymer. Depending on the type of radiation used and on its energy, their penetrating power within the material is different. This therefore leads to a different chemical modification. Generally, these types of radiation are used to modify a polymer in the bulk.

The grafting is carried out in two steps, which take place simultaneously or consecutively, depending on whether the monomer, which will modify the first polymer, is present or absent during the treatment with ionizing radiation. This monomer must bear an unsaturated group of vinyl, allyl or acrylic type [1].

One of the main techniques for modifying the surface of polymer materials is the surface polymerization induced by UV irradiation ([2] and [3]). This technique has the advantage of being simple to use and inexpensive. Other techniques have been developed in order to modify the polymer surface properties such as surface deposition (spin-coating, etc.) which results only from a physisorption, the chemical surface modification making it possible to integrate an anchor for the covalent grafting of polymer chains, plasma treatments, corona effect, flame treatment [2], etc.

The modifications induced by UV irradiation may be carried out in the presence of photoinitiators. Thus, the polymer substrates are:

i) firstly chemically modified in order to introduce, at the surface and covalently, the photoinitiator; or ii) modified by direct adsorption of the photoinitiator; or iii) brought into contact with a solution of monomers and of photoinitiators; or iv) modified upstream by incorporation of a photoinitiator group at a side chain or at the main chain of the polymer constituting the material.

The role of the photoinitiator is to initiate the polymerization under the effect of light. There are various types of photoinitiator which are presented in articles [2] and [3], along with the various substrates and films obtained at the surface of the materials.

The modifications induced by UV irradiation may be carried out in the absence of photoinitiator. In this variant, the photografting without photoinitiator may be due to a particular type of membranes that are polyarylsulfone (PSf) and polyethersulfone (PES) membranes. Indeed, these two types of membranes have the property of being intrinsically photosensitive and of generating free radicals when they are irradiated with UV radiation [2]. Recently, the irradiation under nitrogen of a PVDF film with a UV lamp (297 nm) followed by bringing into contact with the ambient atmosphere for 10 min has enabled the formation of peroxides and hydroperoxides at its surface. Indeed, when fluoropolymers are subjected to UV irradiation, a defluorination takes place with appearance of alkyl radicals. These peroxide and hydroperoxide radicals will initiate the polymerization of polymethyl methacrylate (pMMA) at the surface of PVDF [4].

The use of shorter wavelengths (therefore of higher energies) is generally used to modify the surface of polymers without the addition of photoinitiator. Irradiation under ambient atmosphere or an atmosphere rich in an active gas such as ammonia or hydrazine, by lamps known as excimer lamps, leads to a surface modification with creation of bonds or of functional groups that are rich in oxygen, or of bonds or functional groups that are rich in nitrogen respectively [5] and [6]. These new functional groups incorporated at the surface of the polymer material may be, secondly, functionalized chemically in order to provide the polymer with a specific property.

The irradiation of polyester film with an Xe excimer lamp (172 nm) under ambient atmosphere has subsequently enabled the grafting of acrylic acid. The modifications generated by this type of lamp only affect the surface of the treated polymers (between 50 and 100 nm) [7]. The same irradiation procedure has been used on polyethylene terephthalate (PET) in the presence of 1-octene and n-nonane in vapor form. The photochemical grafting was confirmed by XPS and contact angle [8].

However, it should be noted, for example, that a denser excitation may lead to crosslinking ([9] and [10]) or to chain scissions ([10] and [11]).

From the prior art studies, it appears that V-UV (for vacuum UV) irradiations make it possible to modify the surface of polymers without creating damage in the "bulk" (i.e. the depth, the volume or the thickness) of the polymers. This is explained by the fact that the penetration of the V-UV radiation into the polymers would not exceed a few hundreds of nanometers due to the high absorption coefficient of the polymers [12].

The effect of V-UV irradiation (112 nm) under vacuum has demonstrated that the destruction of the polymer depends on its structure, on its absorption coefficient but also on the intensity and on the wavelength of the V-UV radiation. This type of irradiation produces bond scissions and the formation of free radicals at the surface, this being at a distance of less than 250 nm relative to the surface. There is then the creation of fragments of chains released from the surface in the form of volatile species, creation of ethylenic bonds, formation of crosslinking or both [13].

The V-UV irradiation of films of PVDF and of P(VDF$_{70}$-TrFE$_{30}$) has shown that the degree of crosslinking obtained differs after γ or V-UV irradiation. It depends on the absorption characteristics of the polymer. In films of PVDF (homopolymer), the short wavelengths are absorbed in the first micrometers of its thickness whereas the high wavelengths are dissipated in the form of heat in the polymer. For the copolymers of PVDF, there is equivalence for the small wavelengths, whereas the larger wavelengths are absorbed in the "bulk" and generate radicals which, by recombining, give crosslinking. The irradiation of PVDF by UV radiation mainly leads to chain scissions ([9] and [11]).

The modifications can also be induced by laser irradiation. Generally, lasers are used for carrying out the ablation of polymers and creating surface structuring [14]. The irradiation of PVDF film with ArF and KrF excimer lasers has made it possible to produce structures of the diene and triene type at the surface via single-photon and multi-photon processes [15].

This type of irradiation carried out under atmospheres rich in ammonia or in hydrazine gas results in the surface incorporation of nitrogen atoms or in the formation of amine functional groups on membranes made of PC or of PTFE ([16] and [17]).

The irradiation of a PET film having a thickness of 70 μm with a $CO_2$ laser under an oxygen-rich atmosphere has, subsequently, enabled the surface grafting of a 15 μm polyacrylamide film. For the authors, there can be no grafting in the "bulk" after a laser irradiation [18]. In the same way, the irradiation of a film of polyurethane (PU) in the presence of an aqueous solution of alginic acid by an XeCl excimer laser resulted in the creation of a covalent bond between the surface of the PU and the alginic acid [19].

On the one hand, the chemical modification within the depth of a polymer matrix by radical grafting of a compound bearing an ethylenically unsaturated group or repeating units derived from such a compound involves the irradiation of said matrix for example by a beam of electrons, by heavy ions or by γ radiation [1]. These techniques can only be implemented using heavy and expensive equipment. There is therefore a real need for a process that enables the modification of a polymer matrix in depth that is simple to use and inexpensive. On the other hand, it is clear for a person skilled in the art, by virtue of the abundant prior art at his disposal, that the radical grafting within the depth of a polymer matrix cannot be obtained by irradiating the latter with UV radiation.

SUMMARY OF THE INVENTION

The work of the inventors has made it possible to solve the technical problem described above while overcoming the technical prejudice as defined above via a suitable choice of polymer matrix, of irradiation wavelength and of monomer to be grafted. Specifically, via the particular selection of such components, the inventors have shown that the grafting by a compound bearing an ethylenically unsaturated group or repeating units derived from such a compound was possible within the thickness of a polymer matrix.

More particularly, the inventors have shown that the irradiation of certain polymer matrices via UV radiation having a certain wavelength make it possible to obtain, within the thickness of said matrix, activated zones which may participate in a radical grafting and/or be chemically developed or hollowed out.

Specifically, the process of the invention comprises a first step of irradiation of a polymer matrix, this step of irradiation having the role of creating free radicals in the constituent material of the matrix, this creation of free radicals being a consequence of the transfer of energy from the irradiation to said material. For example, in the case of a polymer matrix made of polyvinylidene fluoride, the free radicals created are alkyl and fluoroalkyl groups bearing a free electron. The radicals generated within the depth of the irradiated polymer matrix are relatively stable with lifetimes in particular greater than 24 h. Even though the irradiated polymer matrix in accordance with the process of the invention may have some crosslinking with recombination of the radicals, the inventors have clearly demonstrated that a large number of radicals are still present in the matrix; these "residual radicals" can be used for grafting, within the thickness of the matrix, ethylenic monomers or else for enabling the destruction of the irradiated polymer and thus sculpting the matrix in order to create, for example, the impression of a three-dimensional object within this matrix.

From a mechanistic viewpoint, when the UV radiation energy carrier passes through the matrix, it gives its energy to the latter creating activated zones. The activated zones are generated within the thickness of the polymer matrix and have short polymer chains, formed by scission of the existing chains during the passage of the UV radiation in the material during the irradiation and that have free radicals.

Thus, the present invention relates to a process for chemically modifying, within its thickness, a polymer matrix chosen from matrices made of fluoropolymers and matrices made of aliphatic polymers, said process comprising at least one step consisting in irradiating said matrix with UV light having a wavelength of less than 300 nm in order to generate, within the thickness of said matrix, zones that have short polymer chains, formed by scission of the existing chains during the passage of the UV radiation and that have free radicals denoted hereinbelow as "activated zones".

In the context of the present invention, the expression "chemically modifying" is understood to mean:
- either the creation of the activated zones within the thickness of the polymer matrix;
- or a grafting in the polymer matrix of at least one unit derived from the compound bearing an ethylenically unsaturated group and advantageously several units of the (or of different) compound(s) bearing an ethylenically unsaturated group brought into the presence of the irradiated polymer matrix, the first of these units being bonded to the polymer matrix by a covalent bond involving an atom of said matrix and an atom of said unit;
- or the act of chemically developing or hollowing out the activated zones present within the thickness of the polymer matrix.

Within the context of the present invention, the expression "chemically modifying within its thickness" is understood to mean the fact that the creation, the grafting or the developing as defined previously take place in depth in the polymer matrix (i.e. in the "bulk" of the matrix), as opposed to at the surface of said matrix, this being at a distance greater than 150 nm, especially greater than 200 nm and, in particular, greater than 250 nm with respect to the surface of the polymer matrix undergoing the UV irradiation. The expressions "in depth", "within the thickness of the matrix" and "within the volume of the matrix" are equivalent expressions.

As a reminder, UV are classified as a function of their wavelength with UV-A having a wavelength between 400 and 315 nm; UV-B having a wavelength between 315 and 280 nm and UV-C having a wavelength between 280 and 10 nm. The UV-C spectral band is constituted of three sub-bands: (1) UV-C from 280 to 200 nm; (2) V-UV from 200 to 100 nm, that is to say the UV radiation exploited under vacuum only and (3) X-UV from 100 to 10 nm, electromagnetic transitions between UV rays and X-rays.

The present invention applies to a polymer matrix that is advantageously in the form of a strip of rectangular, square, round, oval or any shape. Advantageously, the strip of polymer matrix used in the process according to the invention has a surface area between 1 mm² and 1 m², especially between 10 mm² and 10 dm² and, in particular, between 1 cm² and 1 dm² and a thickness between 1 μm and 1 cm, especially between 2 μm and 500 μm and, in particular, between 5 μm and 100 μm. Furthermore, the polymer matrix advantageously has at least one of the following two properties:
of being a non-porous polymer matrix;
of being a transparent polymer matrix.

In a first variant of a polymer matrix used within the context of the present invention, the latter is a matrix made of fluoropolymers. The term "fluoropolymer" is understood within the context of the present invention to mean a polymer or a copolymer having one or more fluoro substituents and advantageously no aromatic group in the main chain or in the side chains.

Any fluoropolymer can be used within the context of the present invention. Advantageously, the polymer matrix used within the context of the present invention is a matrix made of a fluoropolymer chosen from the group consisting in:
a vinylidenefluoride homopolymer (PVDF), especially in α form or in β form;
copolymers of vinylidenefluoride with, for example, hexafluoropropylene (HFP), chlorotrifluoroethylene (CTFE), hexafluoropropylene (HFP), perfluoromethyl vinyl ether, trifluoroethylene (VF3), tetrafluoroethylene (TFE) and mixtures thereof;
copolymers of vinylidenefluoride, of trifluoroethylene and of monochlorotrifluoroethylene (VDF-co-TrFE-co-chloroTrFE);
homopolymers and copolymers of trifluoroethylene (VF3), especially with tetrafluoroethylene;
copolymers of fluoroethylene and of propylene;
copolymers of tetrafluoroethylene and of tetrafluoropropylene;
copolymers of ethylene and of at least one fluoromonomer such as, for example, fluoroethylene/propylene (FEP), tetrafluoroethylene, perfluoromethyl-vinyl ether (PMVE), chlorotrifluoro-ethylene (CTFE), hexafluoropropylene (HFP) and mixtures thereof;
and mixtures thereof.

A polymer matrix made of a fluoropolymer advantageously used within the context of the present invention is a PVDF matrix.

In a second variant of a polymer matrix used within the context of the present invention, the latter is a matrix made of aliphatic polymers. The expression "aliphatic polymer" is understood to mean a polymer or a copolymer that does not have an aromatic group either in the main chain or in the side chains.

Any aliphatic polymer can be used within the context of the present invention. Advantageously, the polymer matrix used within the context of the present invention is a matrix made of an aliphatic polymer comprising several units, which are identical or different, of formula (I):

$$—C(R_1)(R_2)—C(R_3)(R_4)— \quad (I)$$

in which the groups $R_1$, $R_2$, $R_3$ and $R_4$, which are identical or different, are chosen from a hydrogen, a halogen, an optionally substituted alkyl group having 1 to 6 carbon atoms and an optionally substituted heteroalkyl group having 1 to 6 carbon atoms, a nitro group, a cyano group, an amine group, a carboxylic acid group, a sulfonic acid group, an amide group, an ester group, an imide group and an ether group.

The expression "alkyl group having 1 to 6 carbon atoms" is understood, within the context of the present invention, to mean a linear, branched or cyclic alkyl group having from 1 to 6, especially from 1 to 4 and, in particular, 1, 2 or 3 carbon atoms.

The expression "heteroalkyl group having 1 to 6 carbon atoms" is understood, within the context of the present invention, to mean an alkyl group as defined previously that also comprises at least one heteroatom advantageously chosen from the group constituted by O, N, P or S.

The expression "optionally substituted" is understood, within the context of the present invention, to mean a group which may be substituted with one or more groups chosen from a halogen, a hydroxy, a cyano, a nitro, an amine group, a carboxylic acid group, a sulfonic acid group, an amide group, an ester group, an imide group or an ether group.

A polymer matrix made of an aliphatic polymer advantageously used within the context of the present invention is a matrix made of polypropylene (PP) or of polyethylene (PE).

Any source of UV light that makes it possible to irradiate the polymer matrix at a wavelength of less than 300 nm and especially between 100 nm and 300 nm can be used within the context of the irradiation step of the present invention. By way of example, mention may be made of a UV lamp, a low-pressure mercury lamp, a medium-pressure mercury lamp, a high-pressure mercury lamp, a very-high-pressure mercury lamp, an electric arc lamp, a halide lamp, a xenon lamp, a laser, an ArF excimer laser, a KrF excimer laser, an excimer lamp or synchrotron radiation.

Advantageously, the irradiation of the process according to the invention may be generated by a laser such as an INDI Nd:YAG pulsed laser (Spectra Physics).

As a variant, the irradiation of the process according to the invention may be generated by an excimer lamp such as a xenon excimer lamp.

Furthermore, it is possible, within the context of the present invention, to create activated zones positioned according to a predetermined pattern, and to thus consequently induce the developing and/or the grafting of compounds only in the aforementioned zones. Mention may be made of structuring of the polymer matrix or "patterning". Indeed, it is possible to induce different grafting patterns.

A first technique that enables such a structuring consists in adjusting the irradiation angle relative to the normal of the faces of the matrix using, in particular, a laser. This angle is advantageously between 0 and 90°, especially between 5° and 60°, in particular between 15° and 45° and, more particularly, of the order of 30° (e.g. 30°±5°). It is possible to create, for example, a matrix comprising active zones that cross the matrix oriented in two symmetrical directions. It is possible to use two different sources of UV radiation such as two lasers or to successively carry out an irradiation in two directions in order to create grafting patterns, where the active zones are crossed.

A second technique enabling such structuring consists in carrying out the irradiation step in the presence of a mask. The term "mask" is understood to mean a material that absorbs the UV radiation present at the surface of the polymer matrix and that partly covers it, without being grafted or covalently bonded to the latter. This material consequently makes it possible to "mask" a given volume from the UV radiation and thus to prevent, in this volume, the formation of free radicals following the irradiation and therefore the developing or grafting of compounds bearing an ethylenically unsaturated group. A person skilled in the art knows various materials that can be used as a mask such as materials made of silica, of resin, of Cr, of TaN, or materials used in extreme UV lithography. The use of such a mask makes it possible to create, within the volume of the polymer matrix, a 3D "patterning", especially by creating hollowed out "channels" or "channels" of grafted polymers, when said mask is associated with a UV irradiation generated by a laser.

A third technique that enables such structuring consists in creating a structure of the layer type in the polymer matrix with, for example, a radiochemically grafted or hollowed out polymer matrix layer, a polymer matrix layer alone and a radiochemically grafted or hollowed out polymer matrix layer. Such a layered structure may be obtained by using:
  different wavelength ranges (below 300 nm in order to obtain a radiochemically grafted layer within the thickness and above 300 nm and especially between 300 nm and 500 nm for a surface radiochemically grafted layer); and/or
  various irradiation times.

The irradiation step in the process according to the invention lasts from 1 min to 5 h, especially from 5 min to 1 h, in particular from 15 min to 45 min and, more particularly, from 10 min to 45 min. The irradiation may be singular or may be repeated several times, especially from 2 to 20 times and in particular from 3 to 10 times. In this variant, the wavelength used may be constant or variable from one irradiation to the other or in the course of one and the same irradiation and each irradiation may be of an identical or different duration. Likewise, in the case of a sequential irradiation, the duration of the irradiations typically varies from 5 to 30 min and especially from 10 to 20 min.

The irradiation step in the process according to the invention may be carried out at a temperature between 5° C. and 120° C., especially between 10° C. and 80° C. and, in particular, between 15° C. and 40° C. More particularly, the irradiation step of the process according to the invention is carried out at ambient temperature. The expression "ambient temperature" is understood to mean a temperature of 20° C.±5° C.

The irradiation step in the process according to the invention may be carried out under vacuum or under gas. The use of a particular atmosphere is only pertinent if this atmosphere is composed of one (or more) gas(es) that do(es) not absorb at the irradiation wavelength.

In a first variant, the irradiation step is carried out under an ambient atmosphere, i.e. in the presence of air and therefore of oxygen. The irradiation in air and therefore in oxygen enables, for a PVDF matrix, the creation not only of alkyl radicals but also of peroxide radicals. In fact, it is the encounter of these alkyl radicals with molecular oxygen that produces the peroxide radicals. The formation of peroxide radicals is limited to the surface of the materials and depends on the scattering factor of the molecular oxygen within the material. This scattering is considered to be of the order of 100 to 250 nm from the surface.

In a second variant, the irradiation step is carried out under an inert gas such as argon or under a neutral gas such as nitrogen. The irradiation under nitrogen or under an inert gas makes it possible to generate only radicals of alkyl type and to thus limit the presence of peroxide radicals. In this variant, prior to the irradiation step of the process according to the present invention, the chamber in which the polymer matrix made of fluoropolymers or of aliphatic polymers is found and in which the irradiation will be carried out may be subjected to a stream of nitrogen for a duration between 5 min and 3 h, especially between 15 min and 1 h and, in particular, of the order of 30 min. The expression "of the order of 30 min" is understood to mean a duration of 30 min±10 min. In this way, the chamber is purged and thus the presence of oxygen in the irradiation chamber is avoided.

It should be pointed out that the irradiation step of the process according to the invention advantageously does not require the presence of photoinitiators.

In a first embodiment of the process according to the invention, the latter comprises the steps consisting in:

$a_1$) irradiating said matrix with UV light having a wavelength of less than 300 nm; and $b_1$) bringing said irradiated matrix obtained in step ($a_1$) into contact with at least one compound bearing at least one ethylenically unsaturated group.

This embodiment is based on the principle of radiochemical grafting, that is to say on the principle of grafting via a radical reaction with a previously irradiated polymer matrix.

Indeed, as explained previously, the process of the invention comprises a first step of irradiating a polymer matrix, this irradiation step having the role of creating free radicals in the constituent material of the matrix. Such free radicals are capable of initiating a radical reaction with a compound bearing at least one ethylenically unsaturated group.

Everything which has been described previously for the irradiation step of the process according to the invention also applies to step ($a_1$).

During step ($b_1$) of the process according to the invention, the compound intended to be brought into contact with the irradiated matrix is advantageously a compound comprising, as a group capable of reacting via a radical reaction with the matrix in order to form a covalent bond, an ethylenic group. For this type of compound, the radical reaction takes place in two phases:

a phase of reaction of the compound with the irradiated matrix, this phase being carried out by an opening of the double bond via reaction with a radical center of the matrix, the radical center thus "moving" from the matrix to a carbon atom derived from said compound;
  a phase of polymerization of this compound starting from the radical center created on the grafted compound.

In other words, the free radicals of the constituent material of the matrix give rise to the propagation of the polymerization reaction of the compound brought into contact with the matrix. The radical reaction is thus, in this scenario, a radical polymerization reaction of the compound, starting from the irradiated matrix.

At the end of the process, the chemically modified membranes thus obtained will thus comprise a polymer matrix grafted, within its thickness, with polymers comprising repeating units derived from the polymerization of the compound brought into contact with the irradiated matrix.

Steps ($a_1$) and ($b_1$) of the process according to the present invention may be simultaneous. In this case, the compound bearing an ethylenically unsaturated group is present during the irradiation via the UV rays of the polymer matrix.

As a variant, steps ($a_1$) and ($b_1$) of the process according to the present invention may be successive. In this case, the compound bearing an ethylenically unsaturated group is brought into contact with the previously irradiated polymer matrix.

The compound having at least one ethylenically unsaturated group that can be used during step ($b_1$) of the process is advantageously a compound of formula (II):

$$(R_4)(R_5)C=C(R_6)(R_7) \quad (II)$$

in which the groups $R_4$ to $R_7$, which are identical or different, represent a non-metallic monovalent atom such as a halogen atom, a hydrogen atom, a saturated or unsaturated chemical group such as an alkyl or aryl group, a —$COOR_8$ or —$OC(O)R_8$ group in which $R_8$ represents a hydrogen atom or a $C_1$-$C_{12}$, and preferably $C_1$-$C_6$, alkyl group, a nitrile, a carbonyl, an amine or an amide.

The compound bearing at least one ethylenically unsaturated group is advantageously chosen from the group constituted by vinyl esters such as vinyl acetate, acrylic acid, acrylonitrile, methacrylonitrile, methyl methacrylate, 2-hydroxymethyl methacrylate, ethyl methacrylate, 2-dimethylaminoethyl methacrylate, butyl methacrylate, propyl methacrylate, hydroxyethyl methacrylate, hydroxypropyl methacrylate, glycidyl methacrylate, hydroxyethyl methacrylate, and derivatives thereof; an acrylamide and in particular an aminoethyl, propyl, butyl, pentyl and hexyl methacrylamide, a cyanoacrylate, a diacrylate and dimethacrylate, a triacrylate and trimethacrylate, a tetraacrylate and tetramethacrylate (such as pentaerythritol tetramethacrylate), styrene and derivatives thereof, para-chlorostyrene, pentafluoro-styrene, N-vinylpyrrolidone, 4-vinylpyridine, 2-vinyl-pyridine, vinyl, acryloyl or methacryloyl halides, and divinylbenzene (DVB), and more generally vinyl crosslinking agents or crosslinking agents based on acrylate, on methacrylate, and on derivatives thereof.

During the bringing into contact of the irradiated polymer matrix with the compound bearing at least one ethylenically unsaturated group, the latter is in a solution (S) with a solvent. Advantageously, said solvent is an organic solvent or a protic solvent. As examples of a protic solvent, mention may be made of water, deionized water, distilled water which may or may not be acidified, acetic acid, hydroxylated solvent such as methanol and ethanol, low molecular weight liquid glycols such as ethylene glycol, and mixtures thereof.

Even when the polymer matrix used is non-porous or hydrophobic, the solution (S) containing the compound bearing at least one ethylenically unsaturated group is perfectly capable of penetrating into this matrix and of reswelling it, by choosing, in particular, a suitable solvent. This has been widely described in the literature and especially in [21].

The solution (S) used during step ($b_1$) of the process may contain a single type of compound bearing at least one ethylenically unsaturated group or at least two different types of compound bearing at least one ethylenically unsaturated group. In the latter case, the polymer grafted within the thickness of the polymer matrix following the process according to the invention will be a statistical copolymer.

Furthermore, so as to avoid the homopolymerization of the compounds bearing at least one ethylenically unsaturated group, the solution (S) may also contain a homopolymer inhibitor chosen from the inorganic salts of polyvalent metals, especially ferrous ammonium sulfate and/or copper chloride and, in particular, Mohr's salt.

Advantageously, the contacting step ($b_1$) is carried out at a temperature between 20° C. and 120° C., especially between 30° C. and 100° C., in particular between 40° C. and 80° C. and, more particularly, at a temperature of the order of 60° C. The expression "of the order of 60° C." is understood to mean a temperature of 60° C.±10° C. Furthermore, step ($b_1$) of the process according to the invention has a duration between 15 min and 24 h, especially between 30 min and 12 h and, in particular, between 1 h and 6 h.

Prior to the contacting of the solution (S) with the irradiated polymer matrix and/or from this contacting onwards, the solution (S) may be subjected to a sparging under nitrogen. The nitrogen sparging makes it possible to remove the molecular oxygen present in the solution. Indeed, since oxygen is known to be a radical reaction inhibitor, it is therefore very advantageous to remove it in order to increase the yield of the reaction.

In a second embodiment of the process according to the invention, the latter comprises the steps that consist in:

$a_2$) irradiating said matrix with UV light having a wavelength of less than 300 nm; and $b_2$) chemically developing the activated zones created by the UV radiation.

Everything which has been described previously for the irradiation step of the process according to the invention also applies to step ($a_2$).

This chemical developing consists in bringing the irradiated polymer matrix into contact with a reactant capable of hydrolyzing the activated zones so as to form hollow channels in their place.

According to this embodiment, following irradiation of the polymer matrix by UV rays, the activated zones generated have short polymer chains formed by scission of the existing chains when the UV radiation passes through the material during irradiation. In these activated zones, the rate of hydrolysis during the developing operation is greater than that of the unirradiated parts. Thus it is possible to carry out selective developing. The reactants capable of providing the developing of the activated zones are a function of the constituent material of the matrix.

Thus, the activated zones may especially be treated with a highly basic and oxidizing solution, this solution being known as a "developing solution" or "etching solution". Such a solution especially used when the irradiated matrix is PVDF may comprise NaOH or KOH between 5N and 20N, in particular at 10N, in the presence of an excess of $KMnO_4$. The expression "excess of $KMnO_4$" is understood to mean $KMnO_4$ present in an amount between 0.1 and 15% by weight, especially between 0.2 and 5% by weight and, in particular, of the order of 0.25% by weight in the developing solution.

Advantageously, the contacting step ($b_2$) is carried out at a temperature between 20° C. and 100° C., especially between 40° C. and 80° C. and, in particular, at a temperature of the order of 65° C. The expression "of the order of 65° C." is understood to mean a temperature of 65° C.±10° C. Furthermore, step ($b_2$) of the process according to the invention has a duration between 2 min and 9 h, especially between 5 min and 6 h and, in particular, between 10 min and 3 h.

Other information regarding the reactants and the operating conditions that can be used for the chemical developing may be found in Rev. Mod. Phys., Vol. 55, No. 4, October 1983, p. 925.

The present invention also relates to a process for structuring a polymer matrix made of a fluoropolymer or of an aliphatic polymer consisting in subjecting the latter to a process as defined previously. The term "structuring" is understood, within the context of the present invention, to mean creating activated zones positioned according to a predetermined pattern, and thus consequently inducing the developing and/or grafting of compounds only in the aforementioned zones, as explained previously. All the variants (adjustment of the irradiation angle, presence of a mask, irradiation time, wavelength, etc.) described previously apply to this structuring process.

The present invention also relates to a polymer matrix made of a fluoropolymer or of an aliphatic polymer capable of being chemically modified by a process as defined previously.

Advantageously, the modified polymer matrix according to the present invention has at least one (co)polymer formed from units derived from one or more compound(s) bearing at least one ethylenically unsaturated group being grafted to said polymer matrix, within its thickness. In the chemically modified polymer matrix according to the present invention, the compound(s) bearing at least one ethylenically unsaturated group is (are) as defined previously.

As a variant, the modified polymer matrix according to the present invention has hollow channels within its thickness.

Likewise, in the chemically modified polymer matrix according to the present invention, the fluoropolymer or the aliphatic polymer constituting it is as defined previously.

The chemically modified polymer matrix obtained according to the process of the invention has the same uses and applications as any chemically modified polymer matrix and especially as the polymer matrices that are chemically modified at the surface. Mention may be made of a use for improving the metal/polymer matrix adhesion, a use as a proton-conducting membrane of a fuel cell, as supersorbents, filters or compresses by virtue of the improved retention of solutions or of particular chemical compounds, as biocompatible coatings, as battery separators, etc. As the chemical modification of the polymer matrix according to the present invention is not limited to the surface of the latter, it has the additional advantage with respect to the matrices of the prior art that the properties and characteristics due to the radiochemical grafting are maintained even if the surface of the polymer matrix is damaged.

Other features and advantages of the present invention will become more clearly apparent to a person skilled in the art on reading the examples below given by way of non-limiting illustration and with reference to the appended figures.

DETAILED DESCRIPTION OF PARTICULAR EMBODIMENTS

A. Materials and Methods

Figure 1:
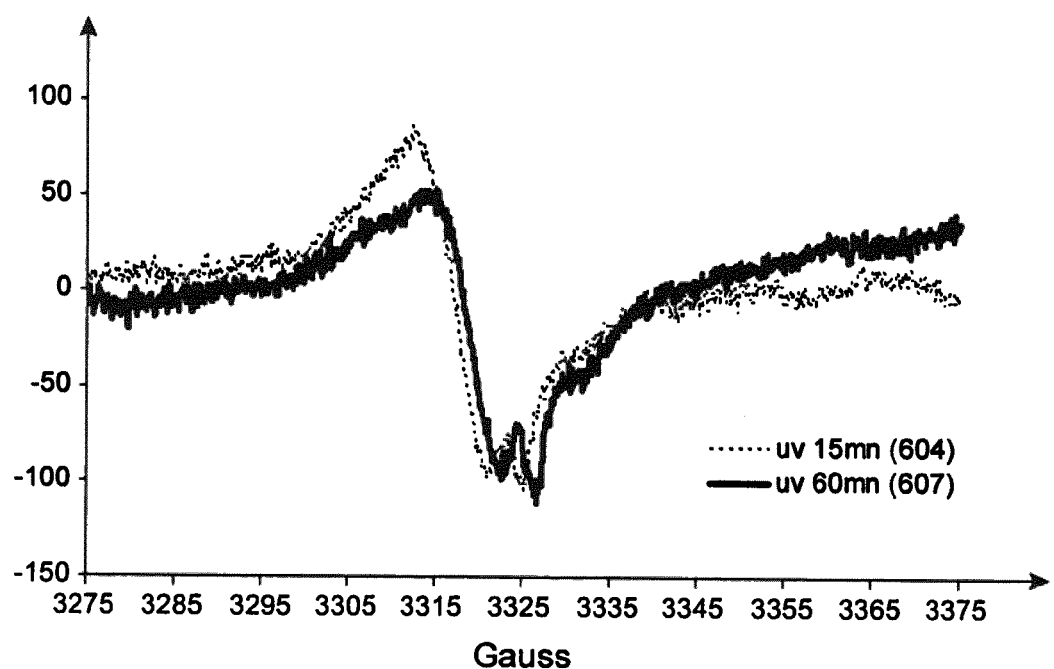
FIG. 1 presents the electron paramagnetic resonance (EPR) spectrum after UV lamp irradiation (320-500 nm), under nitrogen, of a 9 µm PVDF film.

EPR:

The EPR spectra are obtained with an X-band Bruker ESP300E machine operating at a frequency of 9.420 GHz at ambient temperature with a field modulation of 100 kHz and an amplitude modulation of 3 Gauss. All the spectra are normalized to a 100 mg sample and for a gain of 10 $E^4$.

Laser:

The laser irradiations are carried out with an INDI Nd:YAG pulsed laser (Spectra Physics) operating at 266 nm. The duration of each pulse is 8 ns and the pulse repetition frequency is 10 Hz. The final diameter of the laser beam is 8 mm and the energy delivered per pulse is of the order of 2 mJ.

V-UV:

The samples are irradiated using a xenon excimer lamp, the power of which over the whole of the surface is 15 W. The V-UV light has a pulse repetition frequency of 30 kHz and the duration of each pulse is 4 μs.

UV:

The Omnicure Series 2000 lamp is used to irradiate the samples with UV radiation. Having a total power of 200 W, it emits from 320 to 500 nm. It is used without a filter and the samples are placed 4 cm from the source.

ATR-FTIR:

The samples are analyzed by attenuated total reflectance (ATR) Fourier transform infrared spectroscopy with a Magna IR-750 spectrometer (Nicolet). For these measurements, a diamond crystal and also a DIGS (Deuterated Triglycine Sulfate) detector were used. For the surface graftings, 128 spectra were accumulated with a resolution of 2 $cm^{-1}$ and an automatic correction for $H_2O$ and $CO_2$. For the samples grafted in the bulk, 32 spectra were accumulated under the same conditions.

FTIR Mapping:

The mapping of the samples is carried out on a Bruker Hyperion microscope coupled to a Bruker Vertex FTIR spectrophotometer equipped with an MCT detector.

Scanning Electron Microscopy and EDX:

The scanning electron microscopy is carried out using a Philips machine equipped with a lanthanum hexaboride $LaB_6$ tip and coupled to an X-ray detector (PGT PRISM Digital Spectrometer) or EDX (energy dispersive X-ray) probe which makes it possible to analyze the energy of the X-ray photons emitted by the chemical elements of the sample.

The samples are immersed in a solution of KOH or of copper sulfate of 0.05M. The films are then enclosed in an EPON resin (Fluka) before being cut using a Leica microtome. The sections produced are then covered with a layer of gold using an evaporator and are analyzed.

TABLE 1

| Polymer | UV lamp (320-500 nm) | Nd:YAG Laser (266 nm) | Excimer lamp (172 nm) | Polymer grafted | Surface grafting | Volume grafting |
|---|---|---|---|---|---|---|
| PVDF | X | X | X | AA, HEMA, DMAEMA | X | X |
| PE | ND | ND | X | AA | X | X |
| PC | ND | ND | X | AA | X | |
| PET | ND | ND | X | AA | X | |

ND: Not done; AA: acrylic acid; HEMA: 2-hydroxymethyl methacrylate; DMAEMA: 2-dimethylaminoethyl methacrylate; PVDF: polyvinylidene fluoride; PE: polyethylene; PC: polycarbonate; PET: polyethylene terephthalate.

B. Examples

I. Irradiations

I-1. UV Irradiation (500-320 nm).

A strip (1 cm×4 cm) of PVDF having a thickness of 9 μm was placed against the wall of a Pyrex tube then subjected to a stream of nitrogen for 30 min. The Pyrex tube is placed 4 cm away from the optical fiber of a UV lamp (320-500 nm) without any filter. The sample is then subjected to UV irradiation (the PVDF film was placed at a distance of 4 cm excluding the thickness of the Pyrex tube relative to the end of the optical fiber). Four irradiations of 15 min each are carried out successively.

I-2. Nd:YAG Laser Irradiation (266 nm).

I-2.a. 9 μm PVDF Under Nitrogen.

A strip (1 cm×3 cm) of PVDF having a thickness of 9 μm is placed in a quartz vessel having a thickness of 5 mm. After having been subjected to a stream of nitrogen for 15 min, the vessel is sealed and subjected to an irradiation of 30 min.

I-2.b. 9 μm PVDF Under Ambient Atmosphere.

A strip (1 cm×3 cm) of PVDF having a thickness of 9 μm is placed on a glass slide perpendicular to the incident beam of the laser. The surface of the strip is subjected to a direct irradiation of 30 min under ambient atmosphere.

I-3. V-UV Irradiation by an Excimer Lamp (172 nm).

I-3.a. 9 μm PVDF Under Nitrogen.

A strip (2.15 cm×3.8 cm, 13.68 mg) of PVDF having a thickness of 9 μm is placed 7 cm away from an excimer lamp which emits incoherent radiation in the V-UV region at 172 nm. The membrane is fixed to a glass plate, the assembly is purged with a stream of nitrogen for 20 min then subjected to an irradiation of 30 min under nitrogen at ambient temperature.

I-3.b. 25 μm PVDF Under Nitrogen.

A strip (2.15 cm×3.8 cm, 13.60 mg) of PVDF having a thickness of 25 μm is placed 7 cm away from an excimer lamp which emits incoherent radiation in the V-UV region at 172 nm. The membrane is fixed to a glass plate, the assembly is purged with a stream of nitrogen for 20 min then subjected to an irradiation of 30 min under nitrogen at ambient temperature.

I-3.c. 10 μm Polyethylene (PE) Under Nitrogen.

A strip (1.6 cm×4.9 cm, 39.44 mg) of polyethylene (PE) having a thickness of 10 μm is placed 7 cm away from an excimer lamp which emits an incoherent radiation in the V-UV region at 172 nm. The membrane is fixed to a glass plate, the assembly is purged with a stream of nitrogen for 20 min then subjected to an irradiation of 30 min under nitrogen at ambient temperature.

I-3.d. 10 μm Polyethylene Terephthalate (PET) Under Nitrogen.

A strip (1.6 cm×5 cm, 25.61 mg) of polyethylene terephthalate (PET) having a thickness of 10 μm is placed 7 cm away from an excimer lamp which emits an incoherent radiation in the V-UV region at 172 nm. The membrane is fixed to a glass plate, the assembly is purged with a stream of nitrogen for 20 min then subjected to an irradiation of 30 min under nitrogen at ambient temperature.

I-3.e. 10 μm Polycarbonate (PC) Under Nitrogen.

A strip (1.5 cm×5 cm, 9.17 mg) of polycarbonate (PC) having a thickness of 10 μm is placed 7 cm away from an excimer lamp which emits an incoherent radiation in the V-UV region at 172 nm. The membrane is fixed to a glass plate, the assembly is purged with a stream of nitrogen for 20 min then subjected to an irradiation of 30 min under nitrogen at ambient temperature.

II. Study of the Effects of Irradiation on PVDF Membranes by EPR

II-1. Effects of Irradiation on PVDF Induced by a UV Lamp (320-500 nm).

The EPR spectrum after UV lamp irradiation (320-500 nm), under nitrogen, of a 9 μm PVDF film is presented in FIG. 1.

The EPR spectrum obtained shows that there is formation of a paramagnetic center (or defect), that is to say an unpaired electron or radical. The intensity of the signal shows a very small amount of these defects. Furthermore, monitoring their appearance over time shows that the intensity of the signal remains constant. The 320-500 nm UV irradiation appears only to "decorate", that is to say "activate" defects that are already present at the surface of the membranes in relatively small amounts.

II-2. Effects of Irradiation on PVDF Induced by an Nd:YAG Laser (266 nm) Under Nitrogen and Under Ambient Atmosphere.

Figure 2:
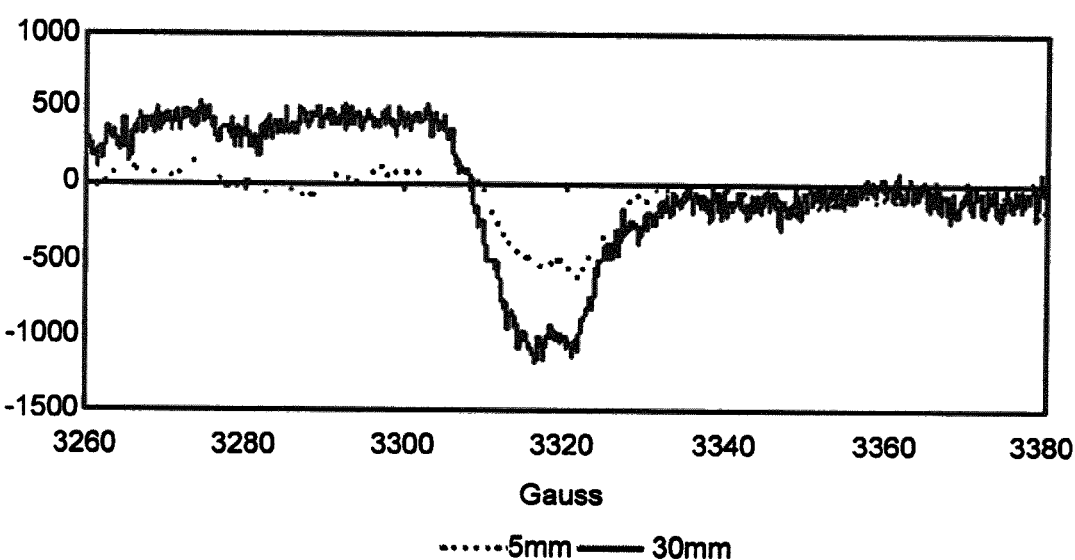
FIG. 2 presents the EPR spectrum after Nd:YAG laser irradiation (266 nm), under nitrogen, of a 9 µm PVDF film.
Figure 3:
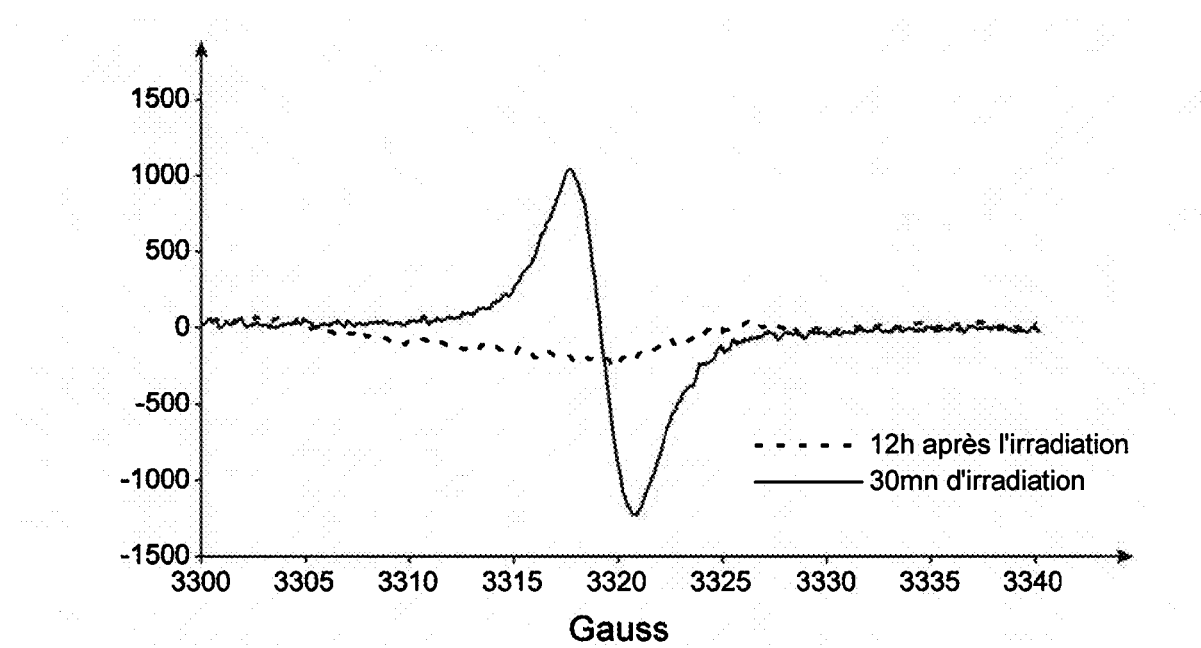
FIG. 3 presents the EPR spectrum after Nd:YAG laser irradiation (266 nm), under ambient atmosphere, of a 9 µm PVDF film.

The EPR spectra after Nd:YAG laser irradiation (266 nm) of a 9 μm PVDF film under nitrogen and under ambient atmosphere are respectively presented in FIG. 2 and FIG. 3.

The EPR spectrum thus obtained also shows the presence of a defect (paramagnetic center), that is to say an unpaired electron or radical. It should be noted that the shape of the curve is different which demonstrates that the defects generated are different, by virtue of their chemical and environmental nature, from those of FIG. 1. The intensity of the signals is also 10 times greater than that obtained after irradiation at 320-500 nm.

Laser irradiation under an inert atmosphere (nitrogen) or under oxygen shows the creation of defects in a similar amount (identical signal intensity) but that have a very different chemical and environmental nature. It should also be noted that the irradiation time increases the amount of defects produced.

Laser irradiation therefore induces a different phenomenon to UV irradiation at 320-500 nm.

II-3. Effects of Irradiation on PVDF Induced by an Xe Excimer Lamp (172 nm).

The EPR spectra obtained after V-UV irradiation at 172 nm are identical to those obtained after irradiations with electrons or with heavy ions [20].

Figure 4:
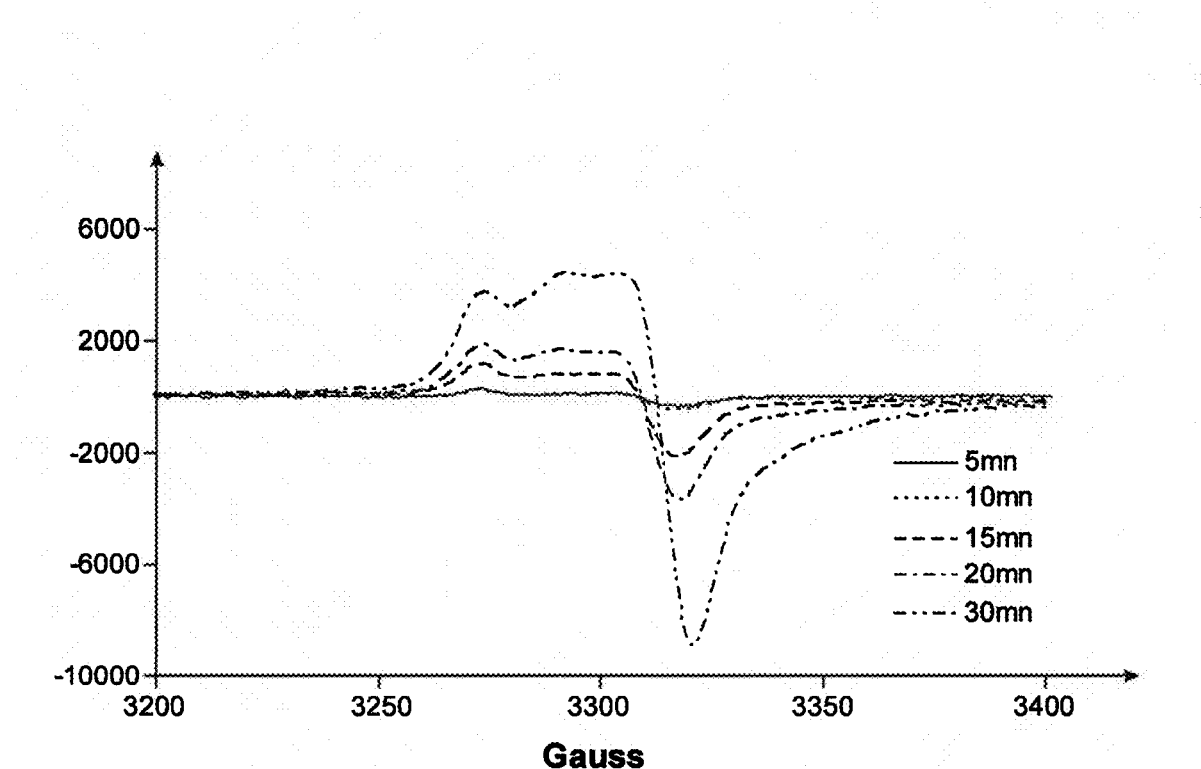
FIG. 4 presents the EPR spectrum after V-UV irradiation (172 nm), under nitrogen, of a 9 µm PVDF film.
Figure 5:
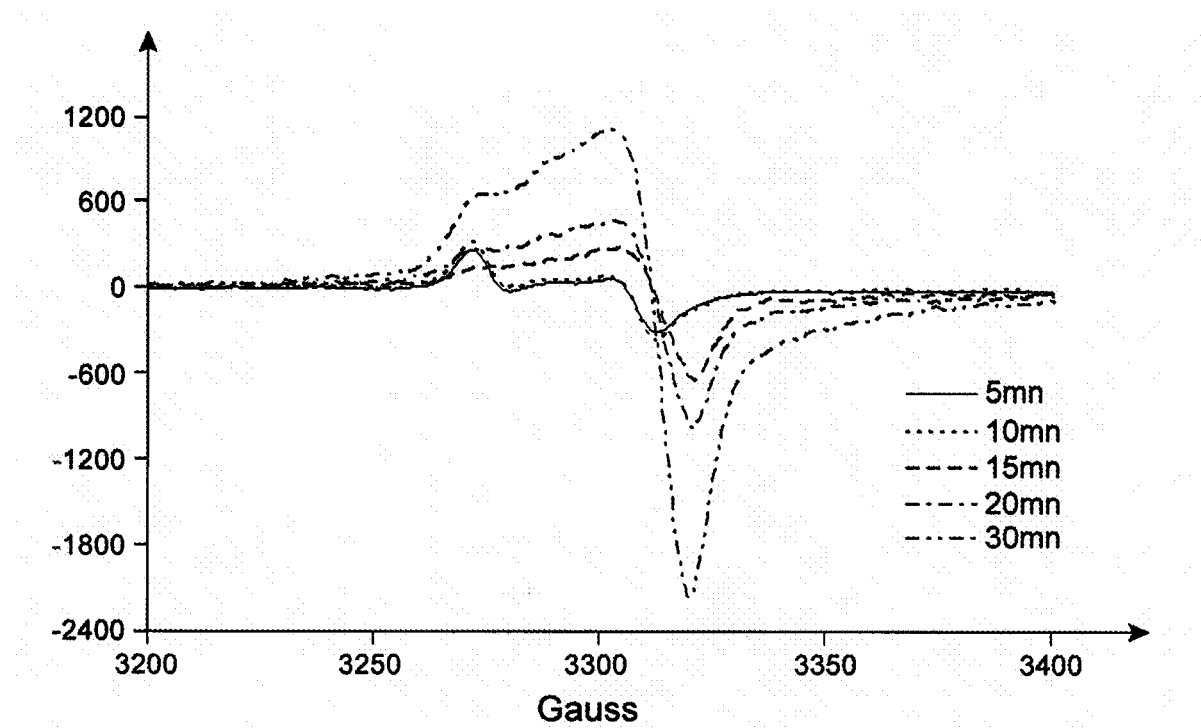
FIG. 5 presents the EPR spectrum after V-UV irradiation (172 nm), under nitrogen, of a 25 µm PVDF film.

The EPR spectra after V-UV irradiation (172 nm) under nitrogen of a 9 μm PVDF film or of a 25 μm PVDF film are respectively presented in FIG. 4 and FIG. 5.

The EPR spectrum shows the creation of defects within the PVDF matrix. The intensity of the signal is greater than 266 nm laser irradiation and 320-500 nm UV irradiation. The shape of the signal obtained shows a complexity representative of the existence of various defects (differences in chemical and environmental nature). These spectra show that the intensity of the signal, that is to say the number of defects, increases with the irradiation time. These spectra of complex nature are due to the presence of various alkyl, fluoroalkyl, hydroperoxide and peroxide radicals.

III. Chemical Modification

III-1. Chemical Modification of a Strip of PVDF Subjected to UV Irradiation (500-320 nm) (Example I-1) with Acrylic Acid.

After irradiation (Example I-1), the strip of PVDF is placed under ambient atmosphere for 10 min before being introduced into a Schlenk tube containing a solution of pure acrylic acid that has previously undergone sparging for one hour under nitrogen. After having sealed the tube, the assembly again undergoes sparging with nitrogen for 10 min before being placed at 60° C. for 6 h.

The modified strip is then cleaned with Milli-Q water, subjected to ultrasounds for 15 min then extracted with boiling water using a Soxhlet apparatus for 18 h. It was then dried for 12 h under high vacuum. Analysis by IR spectrometry of the modified PVDF strip confirms the presence of polyacrylic acid via the presence of a band at 1712 $cm^{-1}$ corresponding to the C=O deformation.

III-2. Chemical Modification of a Strip of PVDF Subjected to UV Irradiation (500-320 nm) (Example I-1) with 2-hydroxymethyl Methacrylate (HEMA).

After irradiation (Example I-1), the strip of PVDF is placed under ambient atmosphere for 10 min before being introduced into a Schlenk tube containing a 70% solution of 2-hydroxymethyl methacrylate (HEMA) in water that has previously undergone sparging for one hour under nitrogen. After having sealed the tube, the assembly again undergoes sparging with nitrogen for 10 min before being placed at 60° C. for 2 h.

The modified strip is then cleaned with a solution of Milli-Q water/ethanol (50/50) and subjected to ultrasounds for 3×15 min. It was then dried for 12 h under high vacuum. Analysis by IR spectrometry of the modified PVDF strip confirms the presence of poly 2-hydroxymethyl methacrylate pHEMA via the presence of a band at 1724 $cm^{-1}$ corresponding to the C=O deformation.

III-3. Chemical Modification of a Strip of PVDF Subjected to UV Irradiation (500-320 nm) (Example I-1) with 2-dimethylaminoethyl methacrylate (DMAEMA).

After irradiation (Example I-1), the strip of PVDF is placed under ambient atmosphere for 10 min before being introduced into a Schlenk tube containing a solution of pure 2-dimethylaminoethyl methacrylate (DMAEMA) that has previously undergone sparging for one hour under nitrogen.

After having sealed the tube, the assembly again undergoes sparging with nitrogen for 10 min before being placed at 60° C. for 2 h.

The modified strip is then cleaned with a solution of Milli-Q water/ethanol (50/50) and subjected to ultrasounds for 3×15 min. It was then dried for 12 h under high vacuum. Analysis by IR spectrometry of the modified PVDF strip confirms the presence of poly(2-dimethylaminoethyl methacrylate) pDMAEMA via the presence of a band at 1725 $cm^{-1}$ corresponding to the C=O deformation.

III-4. Chemical Modification of a Strip of PVDF Subjected to Laser Irradiation (266 nm) Under Nitrogen (Example I-2.a) with Acrylic Acid.

After irradiation (Example I-2.a), the strip of PVDF is placed in a radiochemical grafting tube containing a solution of pure acrylic acid or a 70 wt % solution of acrylic acid in water previously subjected to a sparging with nitrogen for 1 h. The assembly is again subjected to a sparging under nitrogen for 15 min before being placed at 60° C. for 4 h.

The modified strip is then cleaned with Milli-Q water, subjected to ultrasounds for 15 min then extracted with boiling water using a Soxhlet apparatus for 18 h. It was then dried for 12 h under high vacuum. Analysis by IR spectrometry of the modified PVDF strip confirms the presence of polyacrylic acid via the presence of a band at 1712 $cm^{-1}$ corresponding to the C=O deformation.

III-5. Chemical Modification of a Strip of PVDF Subjected to Laser Irradiation (266 nm) Under Ambient Atmosphere (Example I-2.b) with Acrylic Acid.

After irradiation (Example I-2.b), the strip of PVDF is placed in a radiochemical grafting tube containing a solution of pure acrylic acid previously subjected to a sparging with nitrogen for 1 h. The assembly is again subjected to a sparging under nitrogen for 15 min before being placed at 60° C. for 4 h.

The modified strip is then cleaned with Milli-Q water, subjected to ultrasounds for 15 min then extracted with boiling water using a Soxhlet apparatus for 18 h. It was then dried for 12 h under high vacuum. Analysis by IR spectrometry of the modified PVDF strip confirms the presence of polyacrylic acid via the presence of a band at 1712 $cm^{-1}$ corresponding to the C=O deformation.

III-6. Chemical Modification of a 9 μm Strip of PVDF Subjected to V-UV Irradiation (172 nm) (Example I-3.a) with Acrylic Acid.

The 9 μm strip of PVDF previously irradiated (Example I-3.a) was placed in a radiochemical grafting tube containing 80% by weight of acrylic acid in water and 0.25% by weight of Mohr's salt. After 15 min of sparging under nitrogen, the tube is placed in an oil bath at 60° C. for one hour.

The modified strip is then cleaned with Milli-Q water, subjected to ultrasounds for 15 min then extracted with boiling water using a Soxhlet apparatus for 18 h. It was then dried for 12 h under high vacuum. Analysis by IR spectrometry of the modified PVDF strip confirms the presence of polyacrylic acid via the presence of a band at 1712 $cm^{-1}$ corresponding to the C=O deformation.

III-7. Chemical Modification of a 25 μm Strip of PVDF Subjected to V-UV Irradiation (172 nm) (Example I-3.b) with Acrylic Acid.

The 25 μm strip of PVDF previously irradiated (Example I-3.b) was placed in a radiochemical grafting tube containing 80% by weight of acrylic acid in water and 0.25% by weight of Mohr's salt. After 15 min of sparging under nitrogen, the tube is placed in an oil bath at 60° C. for one hour.

The modified strip is then cleaned with Milli-Q water, subjected to ultrasounds for 15 min then extracted with boiling water using a Soxhlet apparatus for 18 h. It was then dried for 12 h under high vacuum. Analysis by IR spectrometry of the modified PVDF strip confirms the presence of polyacrylic acid via the presence of a band at 1712 $cm^{-1}$ corresponding to the C=O deformation.

III-8. Chemical Modification of a 10 μm Thick Strip of PE Subjected to V-UV Irradiation (172 nm) (Example I-3.c) with Acrylic Acid.

The 10 μm thick strip of polyethylene (PE) previously irradiated (Example I-3.c) was placed in a radiochemical grafting tube containing 80% by weight of acrylic acid in water and 0.25% by weight of Mohr's salt. After 15 min of sparging under nitrogen, the tube is placed in an oil bath at 60° C. for one hour.

The modified strip is then cleaned with Milli-Q water, subjected to ultrasounds for 15 min then extracted with boiling water using a Soxhlet apparatus for 18 h. It was then dried for 12 h under high vacuum. Analysis by IR spectrometry of the modified PE strip confirms the presence of polyacrylic acid via the presence of a band at 1701 $cm^{-1}$ corresponding to the C=O deformation. A weight yield of 48.5% was obtained.

III-9. Chemical Modification of a 10 μm Thick Strip of PET Subjected to V-UV Irradiation (172 nm) (Example I-3.d) with Acrylic Acid.

The 10 μm thick strip of polyethylene terephthalate (PET) previously irradiated (Example I-3.d) was placed in a radiochemical grafting tube containing 80% by weight of acrylic acid in water and 0.25% by weight of Mohr's salt. After 15 min of sparging under nitrogen, the tube is placed in an oil bath at 60° C. for 2 h.

The modified strip is then cleaned with Milli-Q water, subjected to ultrasounds for 15 min then extracted with boiling water using a Soxhlet apparatus for 18 h. It was then dried for 12 h under high vacuum. A weight yield of 2% was obtained.

The ATR FTIR results do not make it possible to discriminate, with certainty, the presence of polymers at the surface. What seems certain is that the acrylic acid is not polymerized in the "bulk".

III-10. Chemical Modification of a 10 μm Thick Strip of PC Subjected to V-UV Irradiation (172 nm) (Example I-3.e) with Acrylic Acid.

A 10 μm thick strip of polycarbonate (PC) previously irradiated (Example I-3.e) was placed in a radiochemical grafting tube containing 80% by weight of acrylic acid in water and 0.25% by weight of Mohr's salt. After 15 min of sparging under nitrogen, the tube is placed in an oil bath at 60° C. for 2 h.

The modified strip is then cleaned with Milli-Q water, subjected to ultrasounds for 15 min then extracted with boiling water using a Soxhlet apparatus for 18 h. It was then dried for 12 h under high vacuum. A weight yield of 0.5% was obtained.

The ATR FTIR results do not make it possible to discriminate, with certainty, the presence of polymers at the surface. What seems certain is that the acrylic acid is not polymerized in the "bulk".

IV. Structuring

IV-1. Structuring by Laser Irradiation.

The surface of a 9 μm PVDF film was irradiated with an Nd:YAG laser (266 nm, 30 min) followed by grafting of acrylic acid in accordance with the protocol of Example III-5.

Transmission IR mapping of the surface of the thus treated PVDF film makes it possible to observe, at 1712 cm$^{-1}$, the band of the free u (C=O) of acrylic acid.

IR mapping shows that the irradiation and the radiochemical grafting of acrylic acid are spatially well defined and represent the shape of the beam well.

IV-2. Structuring by Irradiation in the Presence of a Mask.

Two different masks were used:
- Mask 1: Positive mask made of fused silica (Mire USAF, Edmund Optics); and
- Mask 2: Negative mask made of fused silica (Mire USAF, Edmund Optics).

IV-2.a. Structuring by Irradiation and Radiochemical Grafting.

The various strips of PVDF and of PTFE/FEP were irradiated by an excimer lamp at 172 nm under nitrogen for irradiation times typically varying between 10 min and 6 h, especially between 10 min and 2 h.

Grafting Solution:

A solution containing 80% by weight of acrylic acid in water with 0.25% of Mohr's salt undergoes nitrogen bubbling for 15 min. The irradiated sample is then placed in this solution and the whole assembly is then brought to 60° C. for a time which may vary typically between 10 min and 1 h.

Table 2 below gives the operating conditions used.

TABLE 2

| Mask | Pol | Distance (cm) | Time(i) (min) | [AA] | Time(g) (min) | FTIR |
|---|---|---|---|---|---|---|
| 1 | PVDF | 6 | 60 | 80% | 40 | Presence of PAA |
| 2 | PVDF | 5 | 18 | 80% | 60 | Presence of PAA |
| 1 | PVDF | 3.9 | 60 | / | / | / |
| 1 | PVDF | 5.7 | 60 | 80% | 35 | Presence of PAA |
| 1 | PTFE/FEP | 3 | 30 | 80% | 60 | Presence of PAA |

Mask = type of mask; Pol = type of polymer; Distance = Source/sample distance; Time(i) = Irradiation time; [AA] = concentration of monomers in the grafting solution; Time(g) = Grafting time and FTIR = FTIR analysis.

Figure 6:
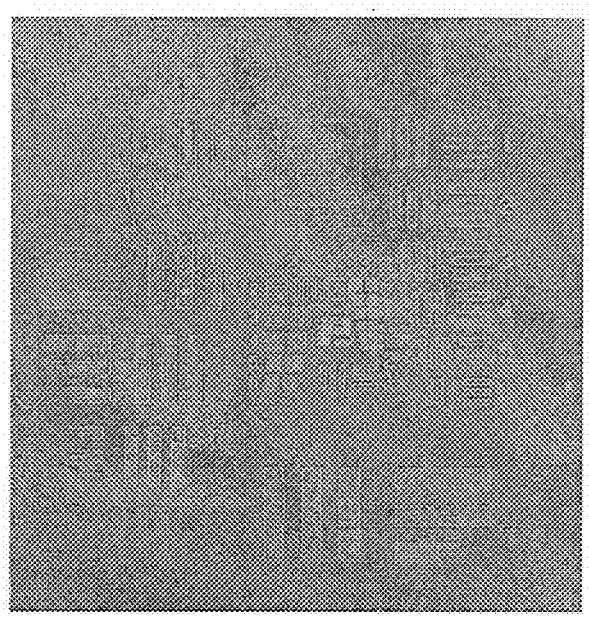
FIG. 6 represents a photograph of a 9 µm PVDF membrane which has been subjected to irradiation with an excimer lamp (172 nm) in the presence of a mask followed by a radiochemical grafting with acrylic acid. The interior of the geometric shapes and numbers is constituted of PVDF-g-PAA whereas the remainder of the membrane is virgin PVDF.
Figure 7:
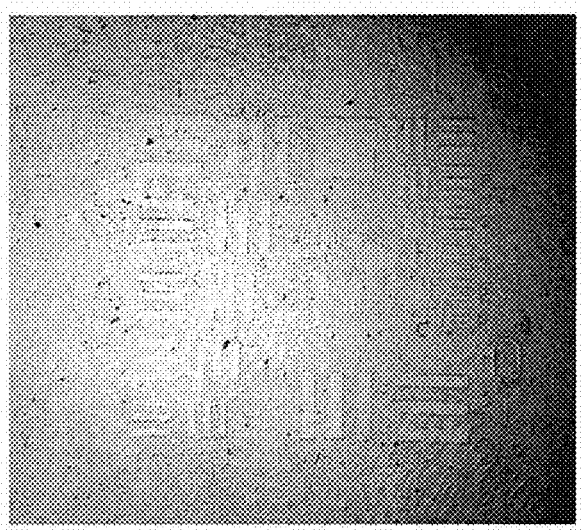
FIG. 7 represents a photograph of a 9 µm PVDF membrane which has been subjected to irradiation with an excimer lamp (172 nm) in the presence of a mask followed by a radiochemical grafting with acrylic acid. The interior of the geometric shapes and numbers is constituted of virgin PVDF whereas the remainder of the membrane is PVDF-g-PAA.

The images of FIG. 6 and FIG. 7 show the results obtained after irradiation with an excimer lamp (172 nm) and in the presence of a positive or negative mask followed by a step of radiochemical grafting with acrylic acid.

In the photograph of FIG. 6, the interior of the geometric shapes and numbers is constituted of PVDF-g-PAA whereas the remainder of the membrane is virgin PVDF.

In the photograph of FIG. 7, the interior of the geometric shapes and numbers is constituted of virgin PVDF whereas the remainder of the membrane is PVDF-g-PAA.

The 3D spectrum obtained after IR mapping of one of the patterns present in the membrane presented in FIG. 7 clearly shows the high spatial resolution of the process presented above.

In order to give additional validation, the sample obtained and presented in FIG. 6 underwent a metallization step.

Metallization Solution:

The sample obtained after irradiation and grafting is immersed, at ambient temperature, into a 0.1N solution of copper sulfate for 15 min. Subsequently, the sample is thoroughly rinsed with Milli-Q water before being placed, twice, under sonication for 2 min.

A 1N solution of sodium hydroxide (30 ml) is heated at 80° C. with stirring. Added to this solution are 300 mg of NaBH$_4$. The sample which has chelated the copper is then placed in the reducing solution for around 3 min, then it is withdrawn from this solution before being thoroughly rinsed with Milli-Q water then dried.

Figure 8:
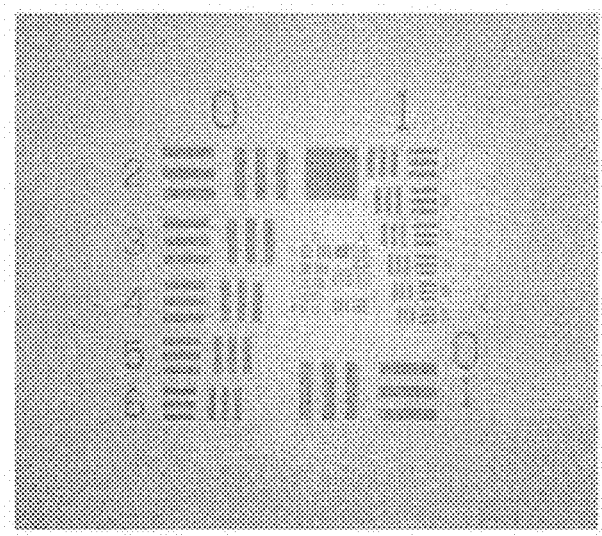
FIG. 8 represents a 9 µm PVDF membrane irradiated with an excimer lamp (172 nm) followed by a step of radiochemical grafting with acrylic acid, then metallized. The zones which have a brown or coppery color correspond to the zones of PVDF-g-PAA which chelated copper ions which were subsequently reduced.

FIG. 8 presents the sample of FIG. 6 previously irradiated with an excimer lamp (172 nm) followed by a step of radiochemical grafting with acrylic acid, then metallized. The zones which have a brown or coppery color correspond to the zones of PVDF-g-PAA which chelated copper ions that were subsequently reduced. This indirect demonstration clearly shows the effectiveness of the means implemented.

IV-2.b. Structuring by Irradiation and Chemical Developing.

The various strips of PVDF were irradiated with an excimer lamp at 172 nm under nitrogen for irradiation times typically varying between 10 min and 6 h, especially between 10 min and 2 h.

The zones which are not protected by the masks are defined as above as active zones in which there are chain ruptures and therefore radicals. These membranes were subjected to a very basic and oxidizing "chemical developing" solution (or "etching" solution) at 70° C. for a time between 10 min and 6 h, especially between 10 min and 3 h.

"Etching" Solution:

A 10N solution of KOH is prepared. Added to this solution is KMnO$_4$ in excess until the solution obtained retains a stable violet color. If the solution changes to blue/green, an addition of KMnO$_4$ is necessary. This solution is then brought to 70° C. with stirring.

Figure 9:
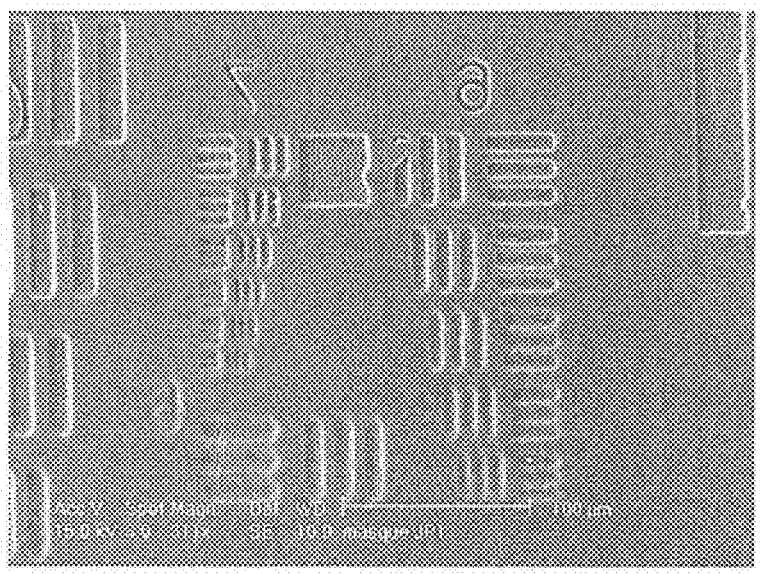
FIG. 9 represents the image obtained with a scanning electron microscope (SEM) of a 9 µm PVDF membrane previously irradiated with an excimer lamp (172 nm) then subjected to a chemical developing operation. The zone presented is the smallest of the three squares present on the initial mask.

FIG. 9 presents the image obtained with a scanning electron microscope (SEM) of this membrane after chemical developing. The zone presented is the smallest of the 3 squares present on the initial mask.

Figure 10:
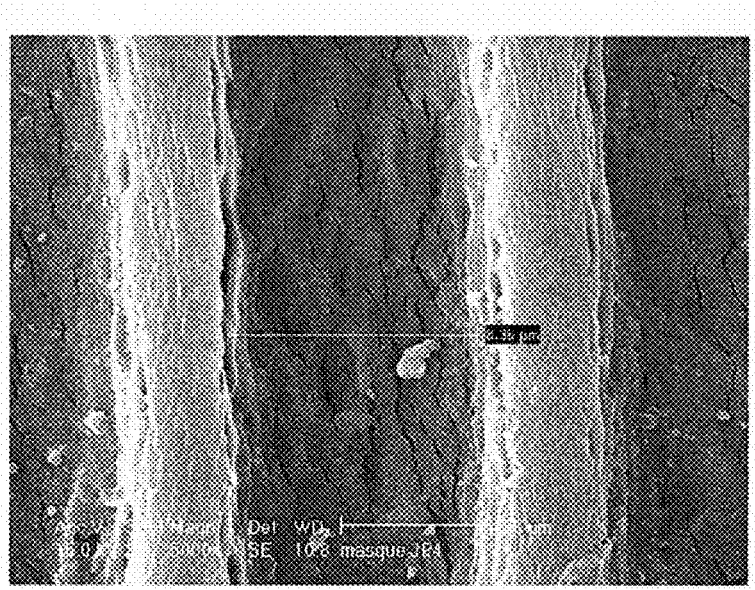
FIG. 10 represents an enlargement of part of FIG. 9 obtained with an SEM. It clearly shows that the PVDF membrane has been "developed" or "hollowed out" at the active zones which were not protected by the mask.

FIG. 10 presents an enlargement of part of FIG. 9 obtained with SEM. It clearly shows that the PVDF membrane has been "developed" or "hollowed out" at the damaged zones which were not protected by the mask.

V. Influence of the V-UV Irradiation Time on the Percentage of Acrylic Acid Grafting The influence of the irradiation time at 172 nm (V-UV) on the PAA grafting yield by weight, on the surface variation after PAA grafting and on the thickness variation after PAA grafting was studied on PVDF membranes having a thickness of 9 μm (Table 3) and 25 μm (Table 4). The irradiation and grafting conditions are identical to those described in Example III-6 for the 9 μm PVDF membranes and to those described in Example III-7 for the 25 μm thick PVDF membranes.

TABLE 3

Influence of the irradiation time at 172 nm of 9 μm PVDF membrane on Y %, S % and E %.

| Irradiation time (min) | Grafting yield by weight (Y %) | Surface variation (S %) | Thickness variation (E %) |
|---|---|---|---|
| 5 | 13.4 | 3.7 | 6.67 |
| 10 | 16.6 | 0 | 11.1 |
| 15 | 45.6 | 3 | 48.9 |
| 30 | 260.7 | 4.7 | 285.2 |

Figure 11:
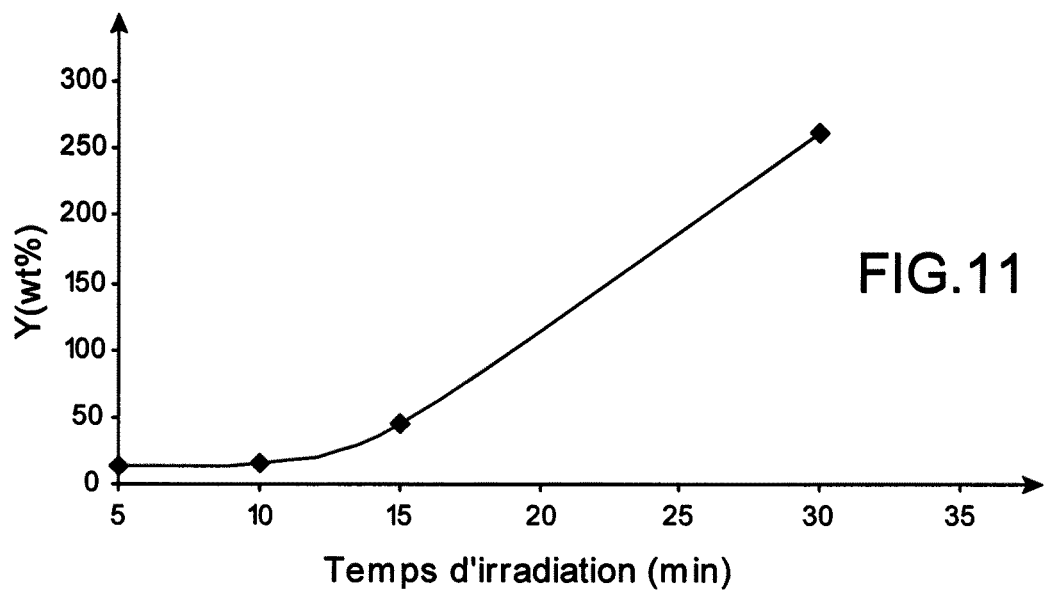
FIG. 11 presents the influence of the irradiation time at 172 nm of a 9 µm PVDF membrane on the grafting yield by weight (Y %).

FIG. 11 is a graphical representation of the grafting yield by weight (Y %) as a function of the irradiation time of 9 μm PVDF membrane.

TABLE 4

Influence of the irradiation time
at 172 nm of 25 μm PVDF membrane on Y %, S % and E %.

| Irradiation time (min) | Grafting yield by weight (Y %) | Surface variation (S %) | Thickness variation (E %) |
|---|---|---|---|
| 5 | 8.1 | 2.9 | 34.4 |
| 10 | 9.5 | 2.9 | 32.8 |
| 15 | 20.5 | 5.6 | 41.6 |
| 20 | 25.2 | 5.6 | 36 |
| 30 | 30.9 | 5.9 | 58.4 |

Figure 12:
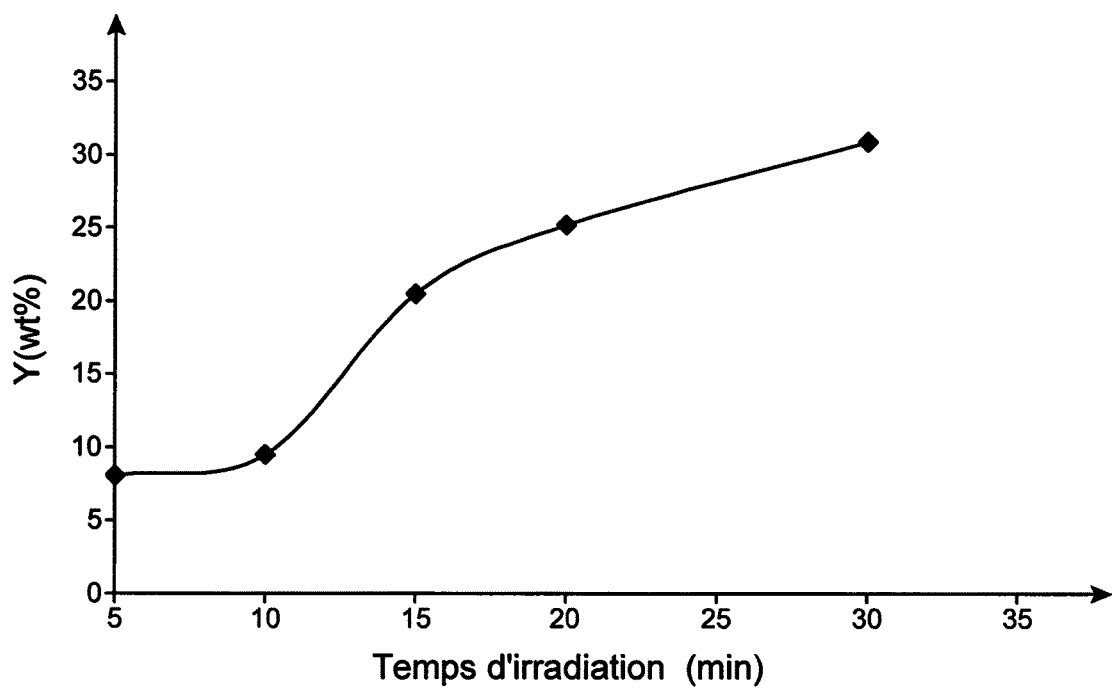
FIG. 12 presents the influence of the irradiation time at 172 nm of a 25 µm PVDF membrane on the grafting yield by weight (Y %).

FIG. 12 is a graphical representation of the grafting yield by weight (Y %) as a function of the irradiation time of 25 μm PVDF membrane.

VI. Penetrating Radiochemical Grafting of PAA in PVDF Type Membranes

EDX analysis makes it possible to obtain spatial and chemical information on the distribution of a chemical element within an object.

The membranes chemically modified with PAA by virtue of the process described above are previously submerged for 24 h in a solution of copper sulfate or of potassium chloride. The protons of the carboxylic acid functional group present in the PAA are then exchanged with the cations which here are copper $Cu^{2+}$ and potassium K. Any zone containing PAA will then be converted to the corresponding salt.

The samples thus obtained are inserted into resins, then sections of membranes are produced. They are subsequently subjected to irradiation by the electrons of the SEM. The detector recovers the X-ray photons emitted by the sample. Depending on the constituent elements of the sample, various X-ray photons of different energy will be emitted. X-ray photons of determined energy correspond to each chemical element. It is therefore possible to obtain, with precision, the location of chemical elements in the section of the membranes.

A profile is obtained by EDX analysis, over a thickness of about 10 microns for membranes of 9 μm, this profile having a uniformity and an average intensity of X-ray photons that corresponds to X-ray photons emitted by the fluorine atom. This result is consistent by virtue of the formation of the PVDF membranes where fluorine is present throughout and in a large amount. Regarding the X-ray photons emitted specifically by copper or potassium, information as to their location and their amount may be obtained. As explained previously, the visualization of X-ray photons for copper and potassium may be directly correlated with the presence of PAA spatially resolved in the section. This type of analysis is the only one that makes it possible to know with precision whether the membrane has been modified in the bulk and whether the grafting of the PAA is penetrating (passes all the way through).

The analyses presented here show that the acrylic acid radiochemical grafting of PVDF membranes irradiated with an excimer lamp (172 nm) or with a laser (266 nm) is penetrating within the thickness (passes all the way through the thickness). This fact is novel with respect to the prior art.

Figure 13:
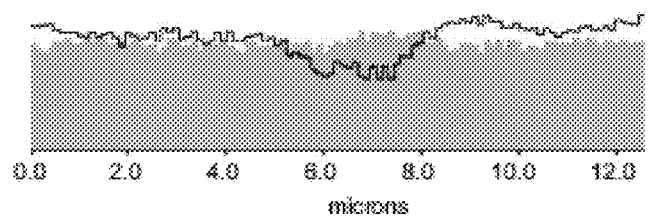
FIG. 13 presents the EDX analysis (fluorine and copper) of the section of a 9 µm PVDF film radiochemically grafted with PAA after irradiation of 30 min with a V-UV excimer lamp (172 nm) under nitrogen.

VI-1. FIG. 13 presents the EDX analysis (fluorine and copper) of the section of a 9 μm PVDF film radiochemically grafted with PAA after irradiation of 30 min with a V-UV excimer lamp (172 nm) under nitrogen.

The same analyses were carried out on films of PVDF radiochemically grafted after irradiation of 5, and 15 min by an excimer lamp (172 nm) under nitrogen and all the analyses showed that the radiochemical grafting was penetrating even after 5 min of irradiation.

Figure 14:
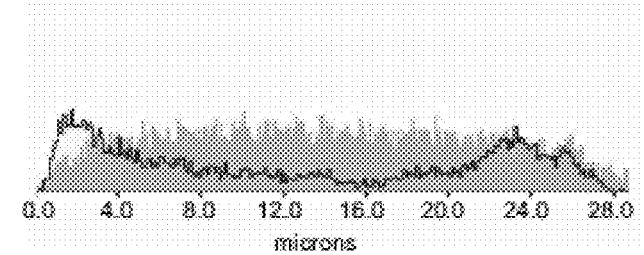
FIG. 14 presents the EDX analysis (fluorine and potassium) of the section of a 25 µm PVDF film radiochemically grafted with PAA after irradiation of 30 min with a V-UV excimer lamp (172 nm).

VI-2. FIG. 14 presents the EDX analysis (fluorine and potassium) of the section of a 25 μm PVDF film radiochemically grafted with PAA after irradiation of 30 min with a V-UV excimer lamp (172 nm).

Figure 15:
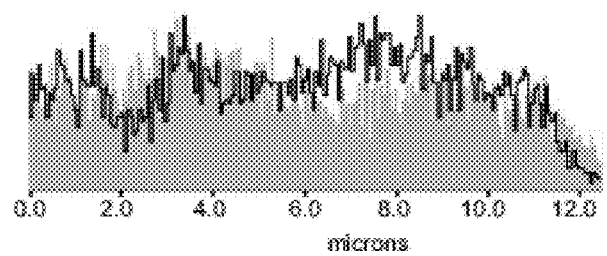
FIG. 15 presents the EDX analysis (fluorine and potassium) of the section of a 9 µm PVDF film radiochemically grafted with PAA after irradiation of 30 min with an Nd:YAG laser (266 nm) under nitrogen.
Figure 16A:
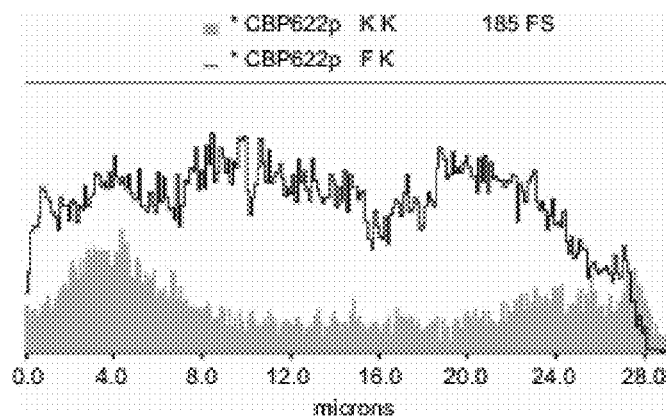
FIG. 16 presents the EDX analysis (fluorine and potassium) of the section of a 25 μm PVDF film radiochemically grafted with PAA after irradiation under nitrogen of 5 min (FIG. 16A), 10 min (FIG. 16B), 15 min (FIG. 16C), 20 min (FIG. 16D) and 30 min (FIG. 16E) by an excimer lamp (172 nm).
Figure 16B:
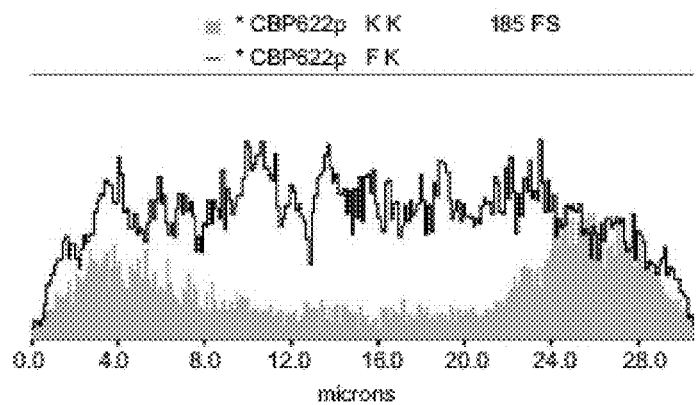
Figure 16C:
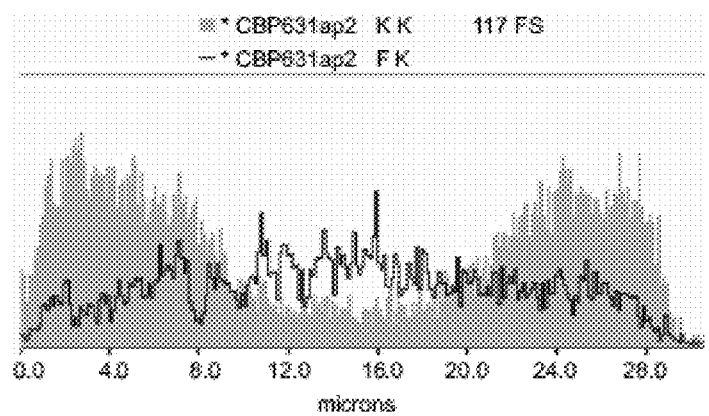
Figure 16D:
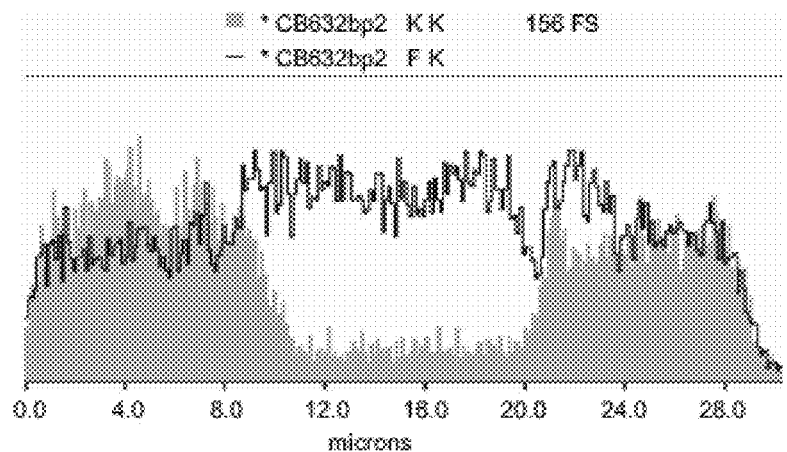
Figure 16E:
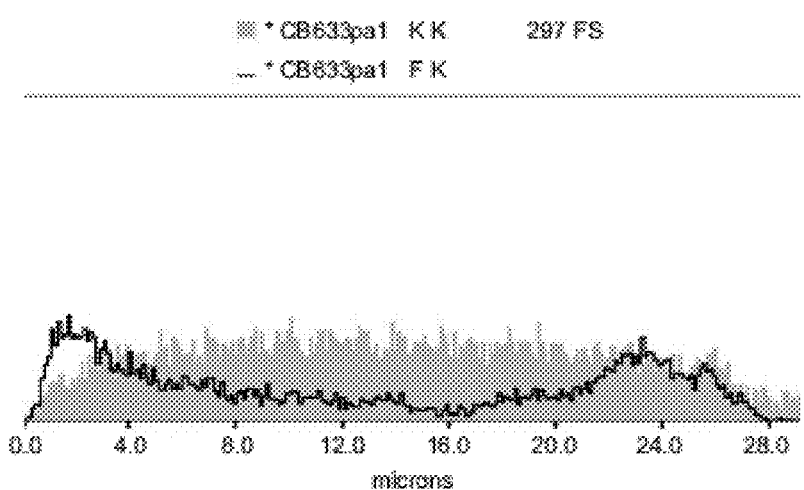

VI-3. FIG. 15 presents the EDX analysis (fluorine and potassium) of the section of a 9 μm PVDF film radiochemically grafted with PAA after irradiation of 30 min with an Nd:YAG laser (266 nm) under nitrogen.

VI-4. FIG. 16 presents the EDX analysis (fluorine and potassium) of the section of a 25 μm PVDF film radiochemically grafted with PAA after irradiation under nitrogen of 5 min (FIG. 16A), 10 min (FIG. 16B), 15 min (FIG. 16C), 20 min (FIG. 16D) and 30 min (FIG. 16E) by an excimer lamp (172 nm). The concentration of acrylic acid is identical for the five times.

For comparison, identical profiles were obtained after electron irradiation (identical dose for all the experiments) but by varying the concentration of acrylic acid [21]. Unfortunately, the control of the thickness of acrylic acid within the PVDF membrane irradiated by an electron beam is not very reproducible. In the case of the present invention, the irradiation time as a function of the thickness of the membrane enables a more precise control of the modification of the film within its thickness.

REFERENCES

[1]. International application WO 2009/040365 in the name of the CEA published on 2 Apr. 2009;
[2]. Deng, J. et al. Progress in Polymer Science. 2009, vol. 34, pages 156-193;
[3]. He, D. et al. Progress in Polymer Science. 2009. vol. 34, pages 62-98;
[4]. Chen, Y. W. et al. Polymer. 2007. vol. 48(26), pages 7604-7613;
[5]. Gejo, J. L. et al. Photochemical & Photobiological Sciences. 2006. vol. 5, pages 948-954;
[6]. Svorcik, V. et al. Nucl. Instr. And Meth. In Phys. Res. B. 2004. vol. 217, pages 307-313;
[7]. Gupta, D. Color. Technol. 2007. vol. 123, pages 248-251;
[8]. Zhu, Z. Applied Surface Science. 2005. vol. 252, pages 303-310;
[9]. Dargaville, T. R. et al. J. Polym. Sci. Pat B: Polym Phys. 2006. vol. 44, pages 3253-3264;
[10]. Pireaux, J. J. et al. Nucl. Instr. And Meth. In Phys. Res. B. 1995, vol. 105, pages 186-191;
[11]. Katan, E. et al. Journal of Applied Polymer Science. 1998. vol. 70, pages 1471-1481;
[12]. Vasilets, V. N. Journal of Polymer Science: part A: Polymer Chemistry. 1998. vol. 36, pages 2215-2222;
[13]. Truica-Marasescu, F-E. Macromolecular Chemistry and Physics. 2005. vol. 206, pages 744-757;
[14]. Lippert, T. Plasma Processes and Polymers. 2005. vol. 2, pages 525-546;
[15]. Izumi, Y. Bull. Chem. Soc. Jpn. 1998. vol. 71, pages 2721-2725;
[16]. Charbonnier, M. Applied Surface Science. 1997. vol. 109/110, pages 206-211;
[17]. Kang, E. T. Advanced Materials. 2000. vol. 12, pages 1481-1494;

[18]. Dadsetan, M. Journal of Applied Polymer Science. 2000. vol. 76, pages 401-407;
[19]. Niino, H. Appl. Phys A. 2001. vol. 72, pages 53-57;
[20]. Betz, N et al. Radiat. Phys. Chem. 1996. vol. 47(3), pages 411-414;
[21]. Clochard, M C. et al. Polymer. 2004. vol. 45, pages 8683-8694.

The invention claimed is:

1. Process for chemically modifying a polymer matrix chosen from matrices made of fluoropolymers and matrices made of aliphatic polymers, at a distance greater than 250 nm with respect to the surface of said matrix, characterized in that said process comprises at least one step (a) consisting in irradiating said matrix with ultraviolet light having a wavelength of less than 300 nm in order to generate, at a distance greater than 250 nm with respect to the surface of said matrix, zones that have short polymer chains, formed by scission of the existing chains during the passage of the ultraviolet radiation and that have free radicals denoted hereinbelow as "activated zones,"
wherein said irradiating step lasts from 1 min to 5 h, and
wherein said matrix has a thickness between 1 μm and 1 cm,
wherein said irradiating step is performed under an inert gas,
wherein said process further comprises the step of bringing said irradiated matrix obtained in said step (a) and which only presents alkyl radicals into contact with a solution containing at least one compound bearing at least one ethylenically unsaturated group,
wherein said solution is subjected to a sparging under nitrogen prior to said contact and from said contacting onwards, and
wherein said polymer matrix is a matrix made of a fluoropolymer chosen from the group consisting of homopolymers and copolymers of vinylidenefluoride; homopolymers and copolymers of trifluoroethylene; copolymers of fluoroethylene and of propylene; copolymers of tetrafluoroethylene and of tetrafluoropropylene; copolymers of ethylene and of at least one fluoromonomer; and mixtures thereof.

2. Process according to claim 1, characterized in that said irradiation is generated by a laser.

3. Process according to claim 1, characterized in that said irradiation is generated by an excimer lamp.

4. Process according to claim 1, characterized in that said irradiation is carried out in the presence of a mask.

5. Process according to claim 1, characterized in that said compound having at least one ethylenically unsaturated group is a compound of formula (II):

$$(R_4)(R_5)C=C(R_6)(R_7) \qquad (II)$$

in which the groups $R_4$ to $R_7$, which are identical or different, represent a non-metallic monovalent atom such as a halogen atom, a hydrogen atom, a saturated or unsaturated chemical group such as an alkyl or aryl group, a —$COOR_8$ or —$OC(O)R_8$ group in which $R_8$ represents a hydrogen atom or a $C_1$—$C_{12}$ alkyl group, a nitrile, a carbonyl, an amine or an amide.

6. Process according to claim 1, characterized in that said compound having at least one ethylenically unsaturated group is chosen from the group constituted by vinyl acetate, acrylic acid, acrylonitrile, methacrylonitrile, methyl methacrylate, 2-hydroxymethyl methacrylate, ethyl methacrylate, 2-dimethylaminoethyl methacrylate, butyl methacrylate, propyl methacrylate, hydroxyethyl methacrylate, hydroxypropyl methacrylate, glycidyl methacrylate, hydroxyethyl methacrylate, and derivatives thereof; an acrylamide, a cyanoacrylate, a diacrylate, a dimethacrylate, a triacrylate, a trimethacrylate, a tetraacrylate, and tetramethacrylate, styrene and derivatives thereof, para-chlorostyrene, pentafluorostyrene, N-vinylpyrrolidone, 4-vinylpyridine, 2-vinylpyridine, vinyl halides, acryloyl halides, methacryloyl halides, and divinylbenzene (DVB).

7. Process according to claim 6, characterized in that said acrylamide is chosen from the group constituted by an aminoethyl methacrylamide, propyl methacrylamide, methacrylamide butyl, pentyl methacrylamide and hexyl methacrylamide.

* * * * *